US012649189B2

(12) United States Patent　　　　　(10) Patent No.:　US 12,649,189 B2

Bookheimer et al.　　　　　　　　　(45) Date of Patent:　　Jun. 9, 2026

---

(54) CLAMPING ASSEMBLY FOR A TOOLHOLDER ASSEMBLY

(71) Applicant: Kennametal Inc., Latrobe, PA (US)

(72) Inventors: Alan J. Bookheimer, Greensburg, PA (US); Austin Baer, Irwin, PA (US); Logan Semnisky, Greensburgh, PA (US)

(73) Assignee: KENNAMETAL INC., Latrobe, PA (US)

( * ) Notice: Subject to any disclaimer, the term of this patent is extended or adjusted under 35 U.S.C. 154(b) by 353 days.

(21) Appl. No.: 18/112,251

(22) Filed: Feb. 21, 2023

(65) Prior Publication Data

US 2024/0278333 A1　　Aug. 22, 2024

(51) Int. Cl.
B23B 31/22　　　(2006.01)
B23B 29/04　　　(2006.01)
B23B 31/107　　(2006.01)

(52) U.S. Cl.
CPC ............ B23B 31/22 (2013.01); B23B 29/046 (2013.01); B23B 31/1071 (2013.01); *B23B 2231/46* (2013.01); *B23B 2260/03* (2013.01)

(58) Field of Classification Search
CPC ... B23B 29/046; B23B 29/1071; B23B 29/04; B23B 29/20; B23B 31/22; B23B 31/1071; B23B 31/265; B23B 31/4033; B23B 2231/46; B23B 2231/24; B23B 2260/03; B23B 2260/034; B23C 5/26
See application file for complete search history.

(56) References Cited

U.S. PATENT DOCUMENTS

| | | | | |
|---|---|---|---|---|
| 3,034,363 | A | * | 5/1962 | Vogel ...................... F16H 53/02 |
| | | | | 74/567 |
| 3,856,428 | A | | 12/1974 | Eversole |
| 4,615,244 | A | | 10/1986 | Reiter et al. |
| 4,710,077 | A | | 12/1987 | Ramunas |
| 4,747,735 | A | | 5/1988 | Erickson et al. |
| 4,890,523 | A | | 1/1990 | Satran |
| 4,932,295 | A | * | 6/1990 | Erickson ............... B23B 31/263 |
| | | | | 82/158 |
| 4,951,536 | A | | 8/1990 | Robertson |

(Continued)

FOREIGN PATENT DOCUMENTS

| | | |
|---|---|---|
| CN | 102123822 A | 7/2011 |
| CN | 102802876 A | 11/2012 |

(Continued)

OTHER PUBLICATIONS

Oct. 17, 2022 Foreign Office Action German Application No. 102020114208.0, 12 pages.

(Continued)

*Primary Examiner* — Nicole N Ramos

(74) *Attorney, Agent, or Firm* — Christopher J. Owens

(57) ABSTRACT

A clamping assembly includes a base member having an internal bore, a lock rod within the internal bore of the base member and moveable between an unlocked position and a locked position, the lock rod including a lock rod cam surface and a first bearing, a crank wheel having an axis of rotation and a third bearing, and a linkage including a second bearing comprising an elongated cavity formed in an outer surface, a fourth bearing and a cam surface at one end thereof.

17 Claims, 18 Drawing Sheets

(56)                References Cited

U.S. PATENT DOCUMENTS

| | | | |
|---|---|---|---|
| 4,981,057 A | 1/1991 | von Haas et al. | |
| 5,054,344 A | 10/1991 | Erickson et al. | |
| 5,169,270 A | 12/1992 | Erickson | |
| 5,173,017 A | 12/1992 | Oshnock et al. | |
| 5,197,720 A | 3/1993 | Renz et al. | |
| 5,245,896 A | 9/1993 | Erickson et al. | |
| 5,346,344 A | 9/1994 | Kress et al. | |
| 5,415,066 A | 5/1995 | Erickson et al. | |
| 5,452,631 A | 9/1995 | Erickson | |
| 5,466,102 A | 11/1995 | Erickson | |
| 5,518,094 A * | 5/1996 | Myrick | F16D 41/07 |
| | | | 192/43.1 |
| 5,599,146 A | 2/1997 | Scheer | |
| 5,697,740 A | 12/1997 | Von Haas et al. | |
| 5,709,510 A | 1/1998 | Scheer | |
| 5,775,857 A | 7/1998 | Johne | |
| 6,000,306 A | 12/1999 | Erickson | |
| 6,003,416 A | 12/1999 | Ando et al. | |
| 6,076,441 A | 6/2000 | Billington | |
| 6,280,126 B1 | 8/2001 | Slocum et al. | |
| 6,343,903 B1 | 2/2002 | Huang et al. | |
| 6,370,995 B1 | 4/2002 | Skoog | |
| 7,610,834 B2 | 11/2009 | Erickson | |
| 8,151,673 B2 | 4/2012 | Erickson et al. | |
| 8,449,228 B2 | 5/2013 | Guy | |
| 8,875,606 B2 * | 11/2014 | Hecht | B23B 29/046 |
| | | | 82/158 |
| 10,022,806 B2 | 7/2018 | Langbein et al. | |
| 10,118,231 B2 | 11/2018 | Bookheimer et al. | |
| 10,449,608 B2 | 10/2019 | Bookheimer et al. | |
| 10,759,061 B2 | 9/2020 | Kendrick | |
| 11,358,227 B2 | 6/2022 | Semnisky et al. | |
| 11,420,269 B2 | 8/2022 | Semnisky et al. | |
| 12,220,750 B2 | 2/2025 | Matlik et al. | |
| 12,325,077 B2 | 6/2025 | Wasterlund et al. | |
| 2003/0024131 A1 | 2/2003 | Erickson et al. | |
| 2003/0114282 A1 | 6/2003 | Kato | |
| 2004/0096285 A1 | 5/2004 | Johne | |
| 2009/0235790 A1 | 9/2009 | Erickson | |
| 2010/0272523 A1 | 10/2010 | Nagaya et al. | |
| 2011/0058908 A1 | 3/2011 | Schaefer | |
| 2011/0067536 A1 | 3/2011 | Erickson | |
| 2011/0236145 A1 * | 9/2011 | Pabel | B23B 51/02 |
| | | | 407/115 |
| 2012/0292863 A1 | 11/2012 | Craig et al. | |
| 2015/0086282 A1 | 3/2015 | Zeeb et al. | |
| 2016/0052063 A1 | 2/2016 | Englund | |
| 2016/0052064 A1 | 2/2016 | Matlik | |
| 2016/0052065 A1 | 2/2016 | Englund | |
| 2016/0195119 A1 | 7/2016 | Bookheimer et al. | |
| 2018/0297124 A1 | 10/2018 | Bookheimer et al. | |
| 2020/0384543 A1 | 12/2020 | Semnisky et al. | |
| 2021/0046594 A1 | 2/2021 | Maurer et al. | |
| 2021/0069797 A1 | 3/2021 | Semnisky et al. | |
| 2022/0219246 A1 | 7/2022 | Fenollosa Climent et al. | |
| 2022/0250165 A1 | 8/2022 | Matlik et al. | |
| 2022/0347764 A1 | 11/2022 | Matlik | |
| 2022/0410280 A1 | 12/2022 | Rimet | |
| 2023/0146914 A1 | 5/2023 | Wasterlund et al. | |
| 2025/0018478 A1 | 1/2025 | Schmieder et al. | |

FOREIGN PATENT DOCUMENTS

| | | | |
|---|---|---|---|
| CN | 103167889 A | 6/2013 | |
| CN | 203924200 U | 11/2014 | |
| CN | 102712049 B | 12/2014 | |
| CN | 105364101 A | 3/2016 | |
| CN | 108723408 A | 11/2018 | |
| DE | 7632521 U1 | 10/1982 | |
| DE | 3410154 A1 | 10/1985 | |
| DE | 4117765 A1 | 12/1992 | |
| DE | 69219151 T2 | 10/1997 | |
| DE | 19818148 A1 | 10/1999 | |
| DE | 69510450 T2 | 12/1999 | |
| DE | 112009000631 T5 | 3/2011 | |
| DE | 102015122385 A1 | 7/2016 | |
| EP | 1050359 A2 | 11/2000 | |
| EP | 2646188 B2 | 11/2019 | |
| JP | 2020171999 A | 10/2020 | |
| JP | 2025001522 A | 1/2025 | |
| TW | 507055 B | 10/2002 | |
| WO | 8902857 A1 | 4/1989 | |
| WO | 9714525 A2 | 4/1997 | |
| WO | 2010060603 A1 | 6/2010 | |
| WO | 2012104671 A2 | 8/2012 | |
| WO | 2020/249550 A1 | 12/2020 | |

OTHER PUBLICATIONS

Dec. 7, 2022 Foreign Office Action German Application No. 102020123599.2, 12 pages.

Apr. 6, 2023 Foreign Office Action Chinese Application No. CN202010473750.6, 18 Pages.

Apr. 6, 2023 Foreign Office Action Chinese Application No. CN202010829865.4, 19 Pages.

Nov. 3, 2023 Foreign Office Action Chinese Application No. CN202010829865.4, 13 Pages.

Dec. 1, 2023 Foreign Office Action Chinese Application No. CN202010473750, 8 Pages.

Apr. 16, 2024 Foreign Office Action Chinese Application No. CN202010473750.6, 8 Pages.

Jul. 5, 2024 Foreign Office Action Chinese Application No. CN202010829865.4, 21 Pages.

Sep. 29, 2024 Foreign Office Action Chinese Application No. CN202010829865.4, 20 Pages.

Mar. 11, 2025 Foreign Office Action German Application No. DE202010114208.8, 10 Pages.

Apr. 11, 2025 Foreign Office Action Chinese Application No. CN202411953267.2, 02 Pages.

Apr. 17, 2025 Foreign Office Action German Application No. DE202010123599.2, 10 Pages.

Xiao D., "Basic Knowledge of Printing Machinery", Printing Industry Press, Mar. 31, 2003, pp. 249.

* cited by examiner

CLAMPING ASSEMBLY FOR A TOOLHOLDER ASSEMBLY

CROSS-NOTING TO RELATED APPLICATIONS

This application is related to application Ser. No. 16/567,327, filed Sep. 11, 2019, entitled "Clamping Assembly, a Toolholder Assembly Comprising A Clamping Assembly And A Toolholder, And A Method Of Changing A Toolholder In A Toolholder Assembly", now U.S. Pat. No. 11,420,269, the entire contents of which is incorporated herein by reference.

FIELD

The present description pertains to a clamping assembly, a toolholder assembly comprising a clamping assembly and a removable toolholder, and a method of changing a toolholder in a toolholder assembly.

BACKGROUND

Typically, metal working operations are performed using a cutting insert of a hard carbide, ceramic, or cermet. Such an insert is mounted to a toolholder. Because of the extreme conditions under which they operate, cutting inserts must be replaced on a regular basis. In order to do this, the cutting insert must be removed from the toolholder. The economies of the metalworking operation make it inefficient to shut a machine down for the length of time required to replace a cutting insert on a toolholder. It is more desirable to utilize a clamping assembly with a removable toolholder such that the entire toolholder with the accompanying cutting insert may be removed and replaced with another toolholder having a new cutting insert already in position on the toolholder.

With this in mind, the focus for efficiency then becomes the ease and speed with which the toolholder may be replaced. This has been one of the motivating factors producing different commercial designs for quick change toolholder assemblies.

Accordingly, those skilled in the art continue with research and development in the field of toolholder assemblies.

SUMMARY

The problem of replacing a toolholder in a quick change toolholder assembly is solved by providing a linkage in the form of a modified slider crank with a cam surface that cooperates with a cam surface on a lock rod.

In one aspect, a clamping assembly includes a base member having an internal bore, a lock rod within the internal bore of the base member and moveable between an unlocked position and a locked position, the lock rod including a lock rod cam surface and a first bearing; a crank wheel having an axis of rotation and a third bearing; and a linkage including a second bearing comprising an elongated cavity formed in an outer wall facing the lock rod, a fourth bearing and a cam surface at one end thereof. The linkage is rotationally and translationally coupled to the lock rod by a first pin joint comprising a first pin received within the first bearing of the lock rod and at least partially received within the second bearing of the linkage. The linkage is rotationally coupled to the crank wheel by a second pin joint comprising a second pin received with the third bearing of the crank wheel and within the fourth bearing of the linkage. Rotation of the crank wheel in a first direction causes the cam surface of the linkage to engage the cam surface of the lock rod to place the lock rod in the unlocked position, and rotation of the crank wheel in a second direction opposite to the first direction causes the first pin to engage the second bearing of the linkage to place the lock rod in the locked position.

In yet another aspect, a method of changing a toolholder in a clamping assembly, the clamping assembly comprising a base member having an internal bore, a lock rod within the internal bore of the base member and moveable between an unlocked position and a locked position, the lock rod including a lock rod cam surface and a first bearing, a crank wheel having an axis of rotation and a third bearing, and a linkage including a second bearing comprising an elongated cavity formed in an outer surface facing the lock rod, a fourth bearing and a cam surface at one end thereof, the method comprising:

rotationally and translationally coupling the linkage to the lock rod by a first pin joint comprising a first pin received within the first bearing of the lock rod and at least partially received within the second bearing of the linkage;

rotationally coupling the linkage to the crank wheel by a second pin joint comprising a second pin received with the third bearing of the crank wheel and within the fourth bearing of the linkage;

rotating the crank wheel in a first direction to cause the cam surface of the linkage to engage the cam surface of the lock rod to place the lock rod in the unlocked position to unclamp a first toolholder from the clamping assembly;

removing the first toolholder from the clamping assembly;

inserting a second toolholder into the clamping assembly; and rotating the crank wheel in a second direction opposite to the first direction to cause the first pin to engage the second bearing of the linkage to place the lock rod in the locked position.

Other embodiments of the disclosed clamping assembly, toolholder assembly, the method of changing a toolholder in a toolholder assembly will become apparent from the following detailed description, the accompanying drawings and the appended claims.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION

Figure 1:
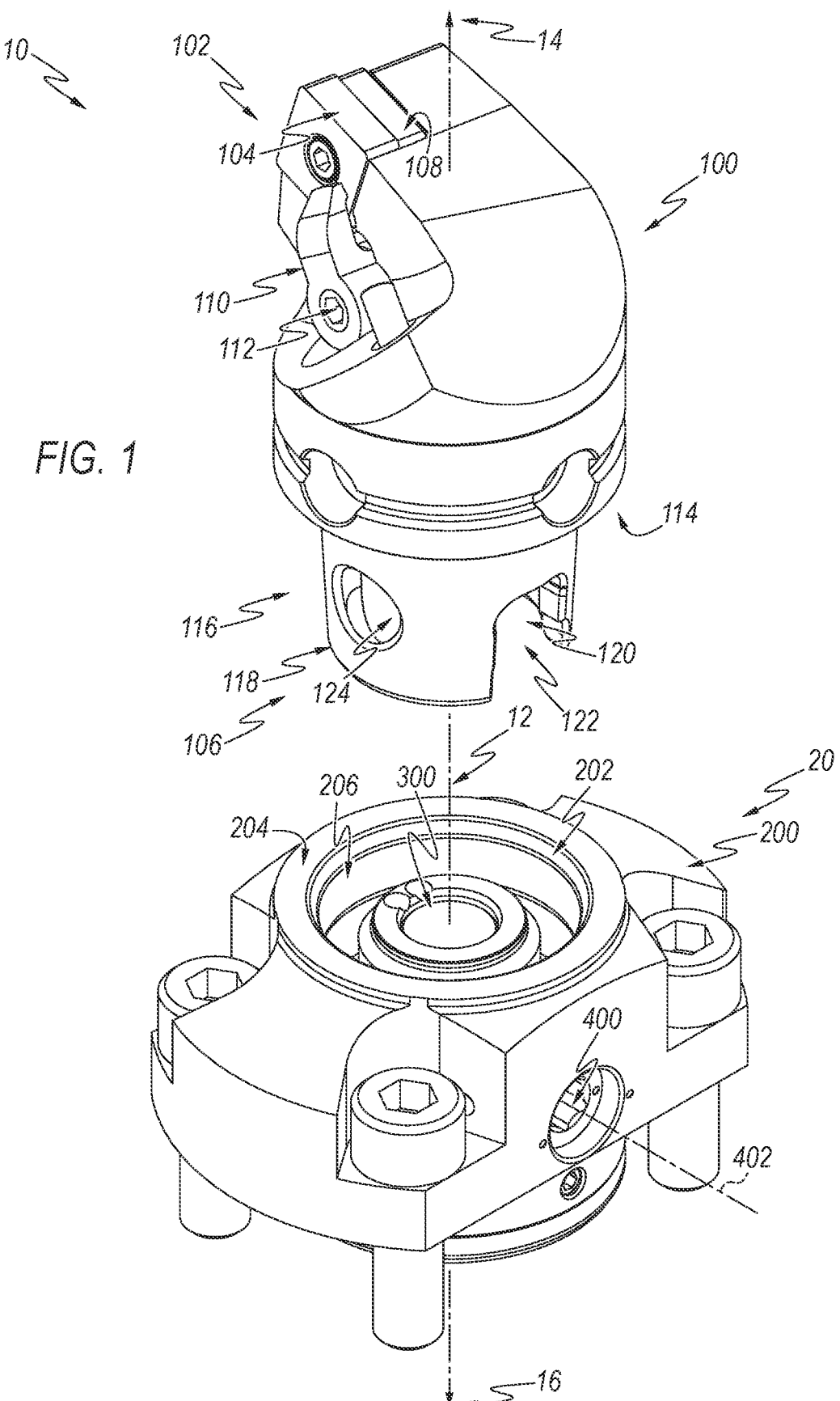
FIG. 1 is a perspective view of an exemplary toolholder assembly according to the present description, the toolholder assembly including a clamping assembly and a toolholder.

Referring to the drawings wherein like reference characters designate like elements there is shown a toolholder assembly, generally designated as 10, according to an example of the present description. The specific kind of cutting assembly 10 illustrated is a turning assembly. The illustration of a turning assembly is not intended to restrict the scope of the invention. Further, the mention of the cutting assembly and cutting insert as a turning assembly and cutting insert is not intended to restrict the scope of the invention. The kinds of cutting assemblies to which the invention relates includes, without limitation, a grooving assembly, a cut-off tool assembly, and a face grooving assembly. The true scope and spirit of the invention is indicated by the claims hereof.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Throughout the text and the claims, use of the word "about" in relation to a range of values (e.g., "about 22 to 35 wt %") is intended to modify both the high and low values recited, and reflects the penumbra of variation associated with measurement, significant figures, and interchangeability, all as understood by a person having ordinary skill in the art to which this invention pertains.

For purposes of this specification (other than in the operating examples), unless otherwise indicated, all numbers expressing quantities and ranges of ingredients, process conditions, etc are to be understood as modified in all instances by the term "about". Accordingly, unless indicated to the contrary, the numerical parameters set forth in this specification and attached claims are approximations that can vary depending upon the desired results sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Further, as used in this specification and the appended claims, the singular forms "a", "an" and "the" are intended to include plural referents, unless expressly and unequivocally limited to one referent.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements including that found in the measuring instrument. Also, it should be understood that any numerical range recited herein is intended to include all sub-ranges subsumed therein. For example, a range of "1 to 10" is intended to include all sub-ranges between and including the recited minimum value of 1 and the recited maximum value of 10, i.e., a range having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

As used herein, the term "elongate" or "elongated" is defined as something that is longer than it is wide. In other words, the width is smaller than its length.

As used herein, a "blind hole" is a hole that is reamed, drilled, or milled to a specified depth without breaking through to the other side of the object.

As used herein, a "through hole" is a hole that is made to go completely through the material of an object. In other words, a "through hole" is a hole that goes all the way through something.

As used herein, a "hole" is defined as a hollow place in a solid body or surface. A hole may be a blind hole or a through hole.

As used herein, a "cavity" is defined as an empty space within a solid object.

As used herein, a "groove" is defined as a long, narrow cut or depression, especially one made to guide motion or receive a corresponding ridge.

As used herein, "tapered surfaces" is defined as any two surfaces that are not parallel to each other, i.e., form a non-zero relative angle.

As used herein, a "cam" is a rotating or sliding piece in a mechanical linkage used especially in transforming rotary motion into linear motion. The most commonly used cam is the cam plate (also known as disc cam or radial cam), which is cut out of a piece of flat metal or plate.

A cylindrical cam or barrel cam is a cam in which the follower rides on the surface of a cylinder. In the most common type, the follower rides in a groove cut into the surface of a cylinder. These cams are principally used to convert rotational motion to linear motion parallel to the rotational axis of the cylinder.

As used herein, a "bearing" is a machine element that allows one part to bear (i.e., to support) another part. The simplest form of bearing, the plain bearing, consists of a shaft rotating in a hole.

As shown in FIGS. 1, 3, 4, 5, and 6, the toolholder assembly 10 includes a clamping assembly 20 and a toolholder 100. The clamping assembly 20 and a toolholder 100 are positioned about a longitudinal axis 12. The toolholder 100 is positioned in a forward direction 14 from the clamping assembly 20 with respect to the longitudinal axis 12, and, thus, the clamping assembly 20 is positioned in a rearward direction 16 from the toolholder 100 with respect to the longitudinal axis 12. This longitudinal axis 12, forward direction 14, and rearward direction 16 will be used as a reference through the specification.

The toolholder 100 has a forward end 102 on which a cutting insert 104 or another tool is mounted and a rearward end 106 opposite the forward end 102. The cutting insert 104 is spaced from the toolholder 100 by a shim 108 and both the cutting insert 104 and the shim 108 are held to the toolholder by a clamp 110, which is secured to the toolholder by a screw 112. The toolholder 100 is typical of a toolholder used for non-rotating tools such as a lathe. However, it should be understood that the toolholder may have attached to it any one of a variety of tools that may be associate with either rotating or non-rotating applications.

Figure 6:
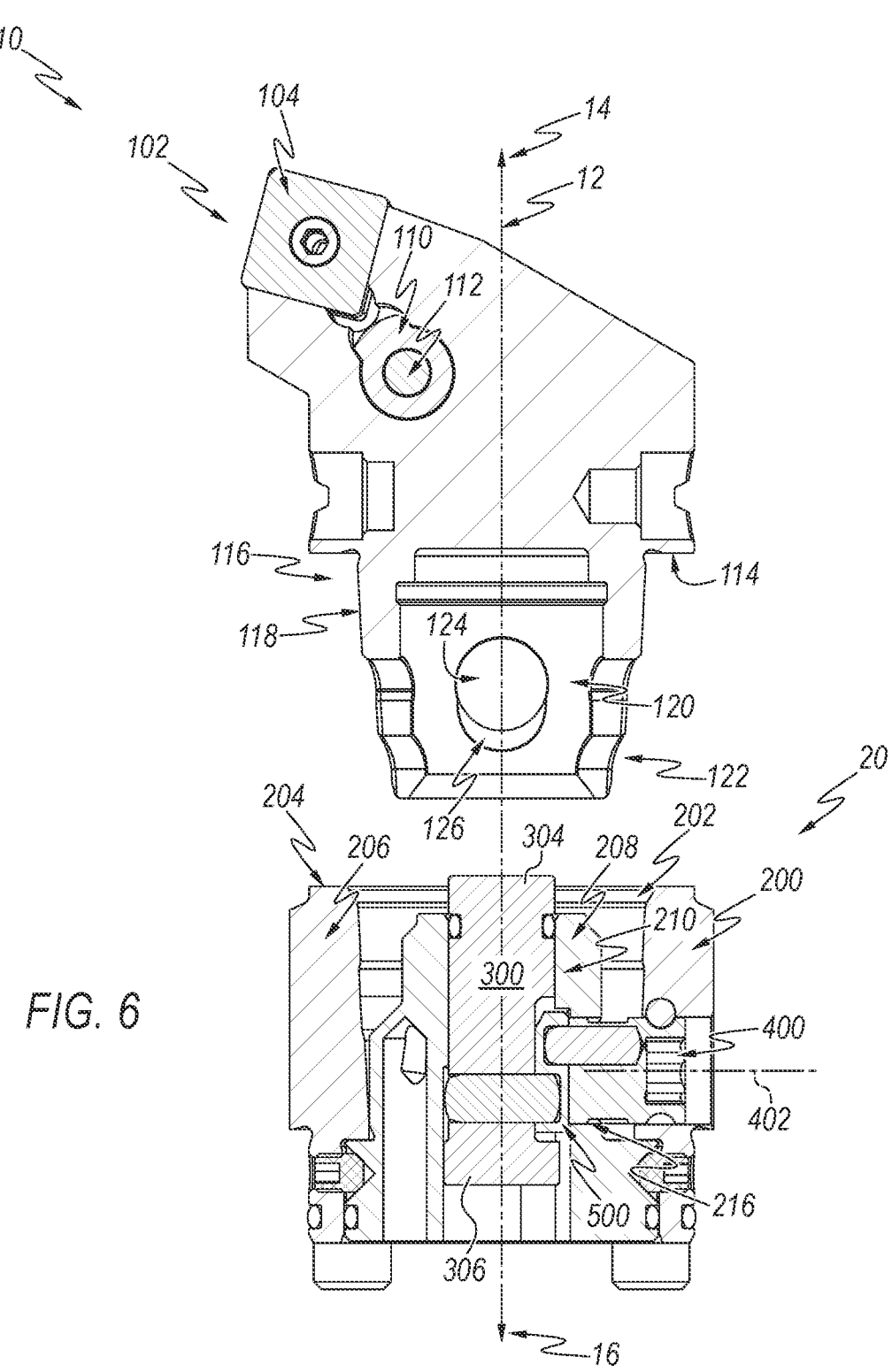
FIG. 6 is a sectional view of the toolholder assembly of FIG. 5 taken along line 6-6.
Figure 7:
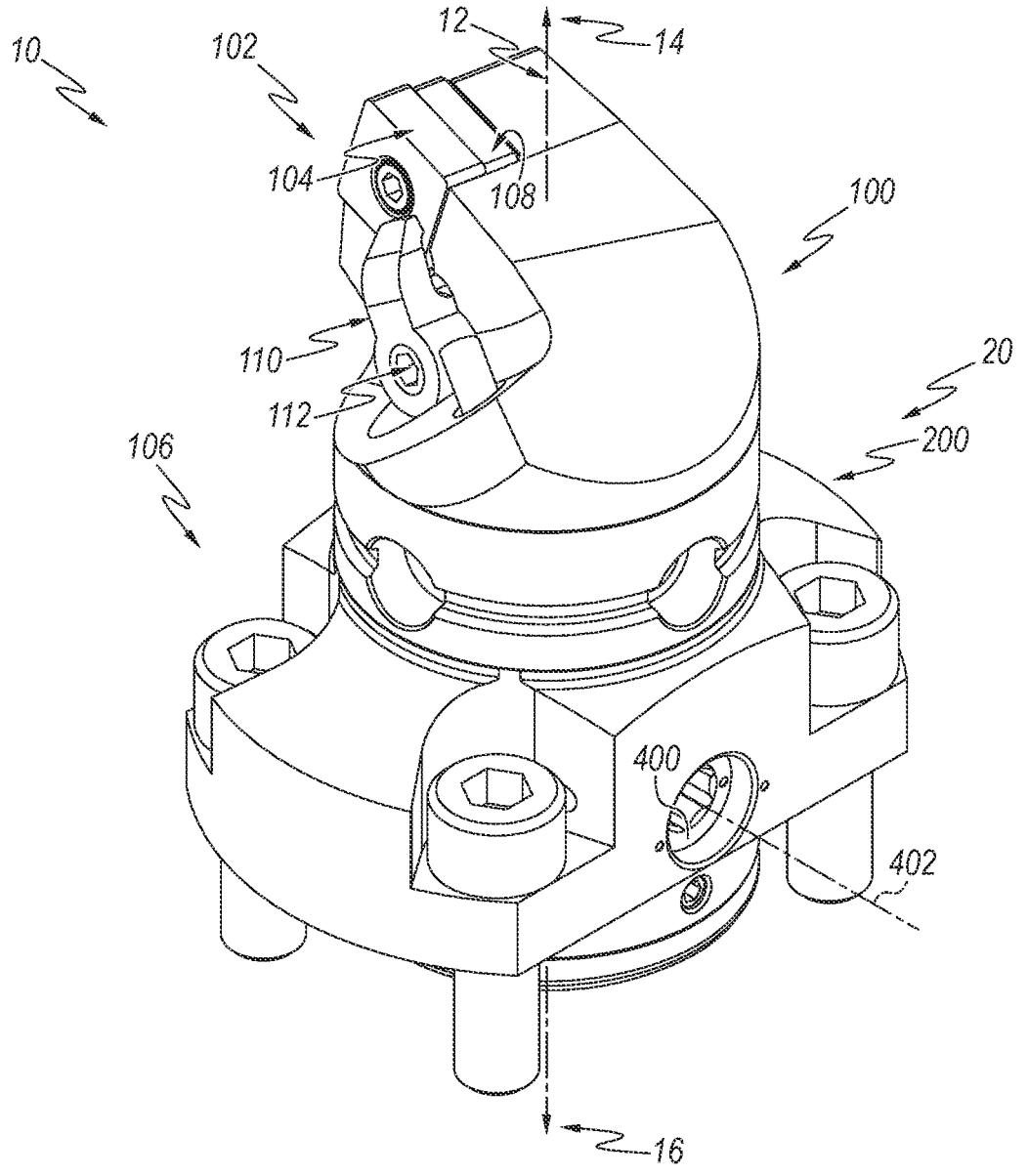
FIG. 7 is a perspective view of the toolholder assembly of FIG. 1 having a shank of the toolholder received in the clamping assembly.
Figure 8:
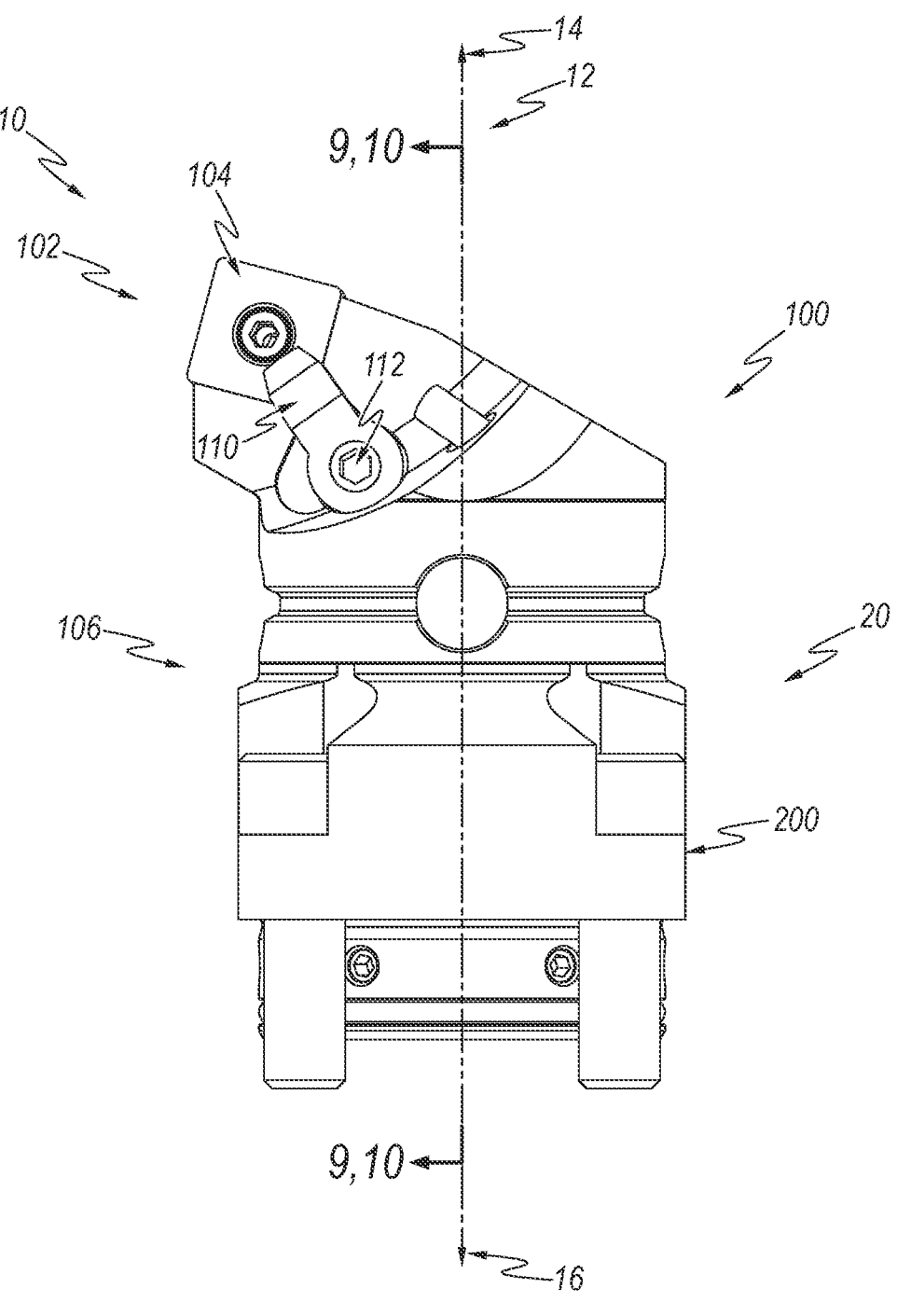
FIG. 8 is a front view of the toolholder assembly of FIG. 7.

The rearward end 106 of the toolholder 100 has a rearwardly facing abutment face 114 and a shank 116 with a shank wall 118 extending rearwardly from the rearwardly facing abutment face 114 and defining a shank bore 120. The shank 116 has a frustoconical shape which tapers inwardly as it extends rearwardly. The shank wall 118 has an alignment slot 122 for aligning the toolholder 100 within the clamping assembly 20, and the shank wall 118 has one or more locking apertures 124. Referring to FIG. 6, the one or more locking apertures 124 have sloped interior surfaces 126 that taper outwardly as they extend forwardly.

As shown in FIGS. 1, 2, 3, 4, and 6, the clamping assembly 20 includes a base member 200 having an internal bore 202, a lock rod 300 within the internal bore 202 of the base member 200 and moveable between an unlocked position and a locked position, a crank wheel 400 having an axis of rotation 402, and a linkage 500 coupled to the lock rod 300 and coupled to the crank wheel 400 at a position radially offset from the axis of rotation 402 of the crank wheel 400. By this arrangement, rotation of the crank wheel 400 drives the movement of the lock rod 300 between the unlocked position and the locked position by way of the coupling of the linkage 500 between the crank wheel 400 and the lock rod 300.

In an aspect, the lock rod 300 is moveable between the locked position and the unlocked position in a non-rotational direction. As illustrated, the lock rod 300 is moveable in the forward direction 14 to an unlocked position and in the rearward direction 16 to a locked position. In an alternative, the lock rod 300 could be moveable in the forward direction 14 to a locked position and in the rearward direction 16 to an unlocked position. By these arrangements, rotation of the crank wheel 400 drives the movement of the lock rod 300 between the forward direction 14 and the rearward direction 16. In another alternative, the lock rod 300 could be moveable between the locked position and the unlocked position in a non-linear direction such that the lock rod 300 moves along a curved axis.

Figure 4:
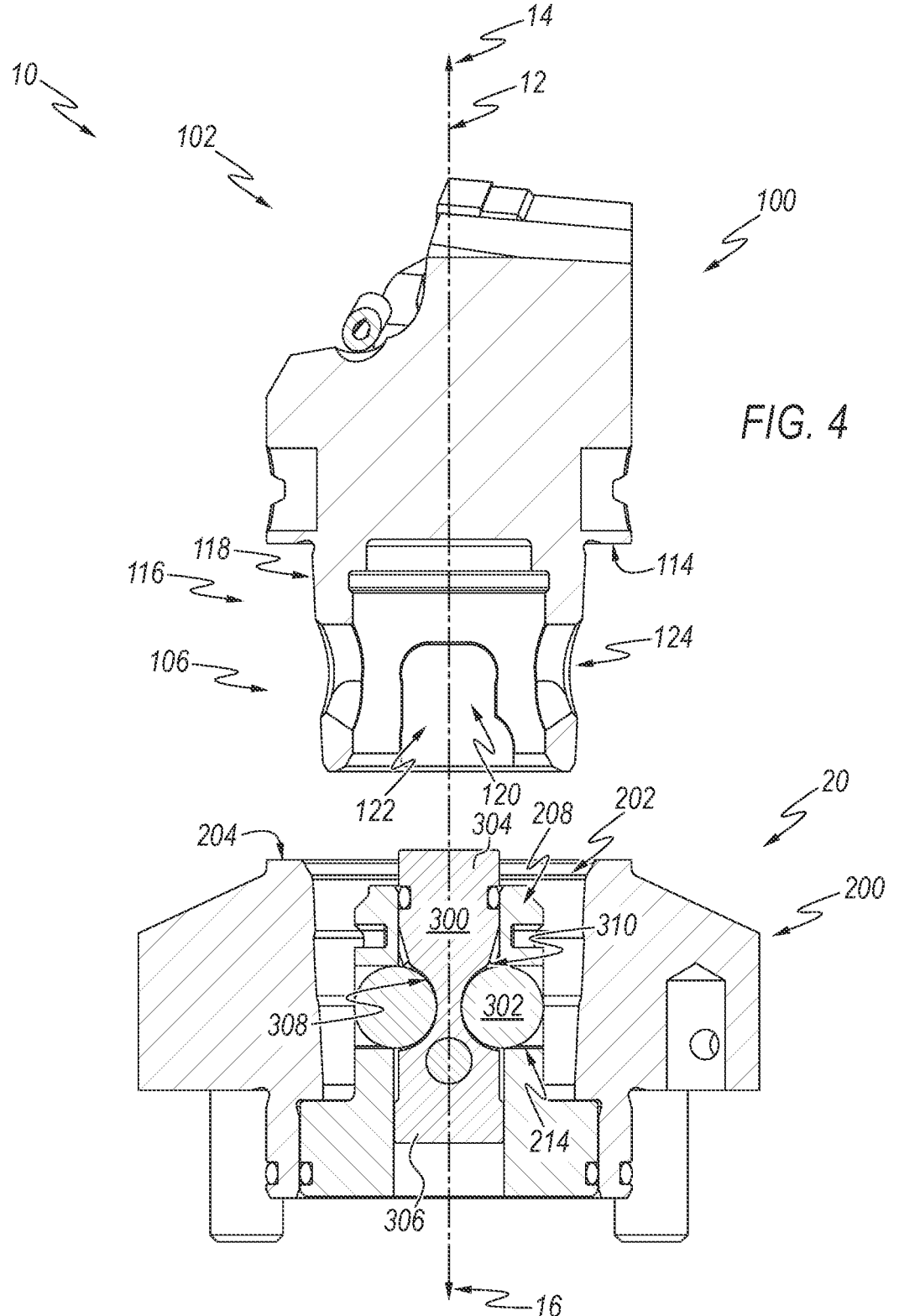
FIG. 4 is a sectional view of the toolholder assembly of FIG. 3 taken along line 4-4.
Figure 5:
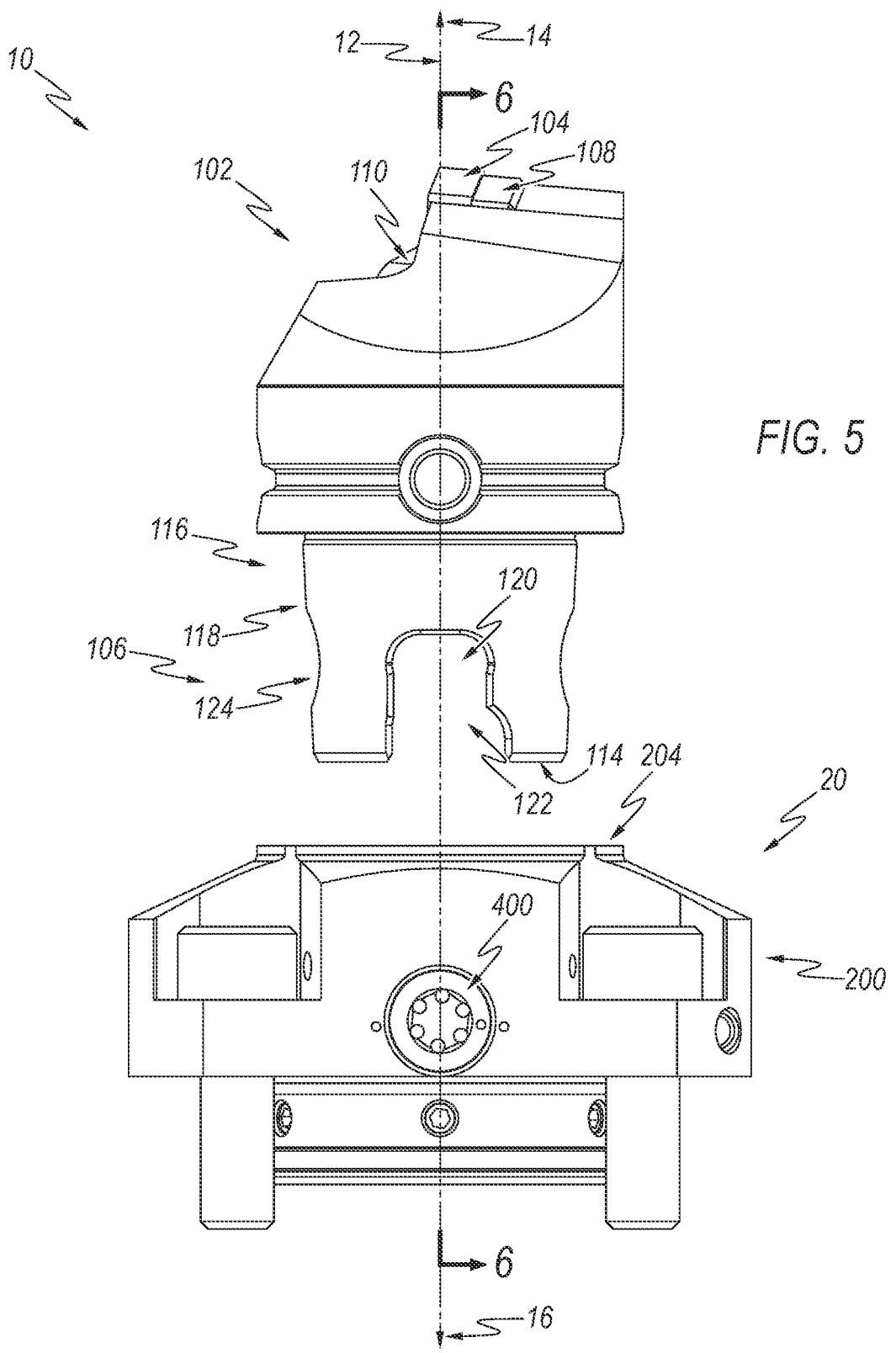
FIG. 5 is a side view of the toolholder assembly of FIG. 1.

As shown in FIGS. 1, 4, and 6, the base member 200 includes a flange 204 for abutting with the rearwardly facing abutment face 114 of the toolholder 100. The flange 204 defines an opening to the internal bore 202 having a bore wall 206, which is sized to receive the shank 116 of the toolholder 100.

Figure 2:
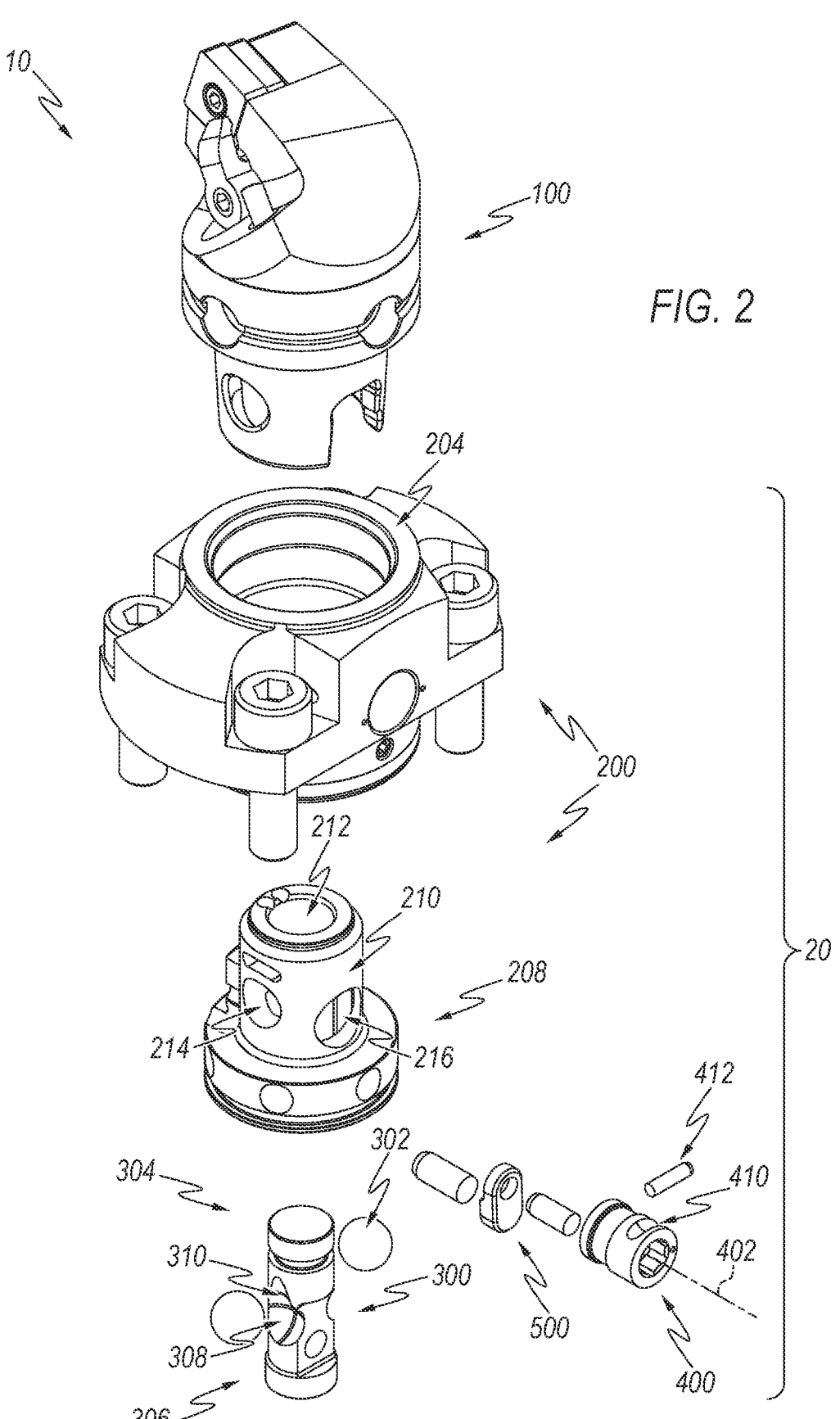
FIG. 2 is an exploded perspective view of the toolholder assembly of FIG. 1, the clamping assembly including a lock rod, a flange, a crank wheel, and a linkage.
Figure 3:
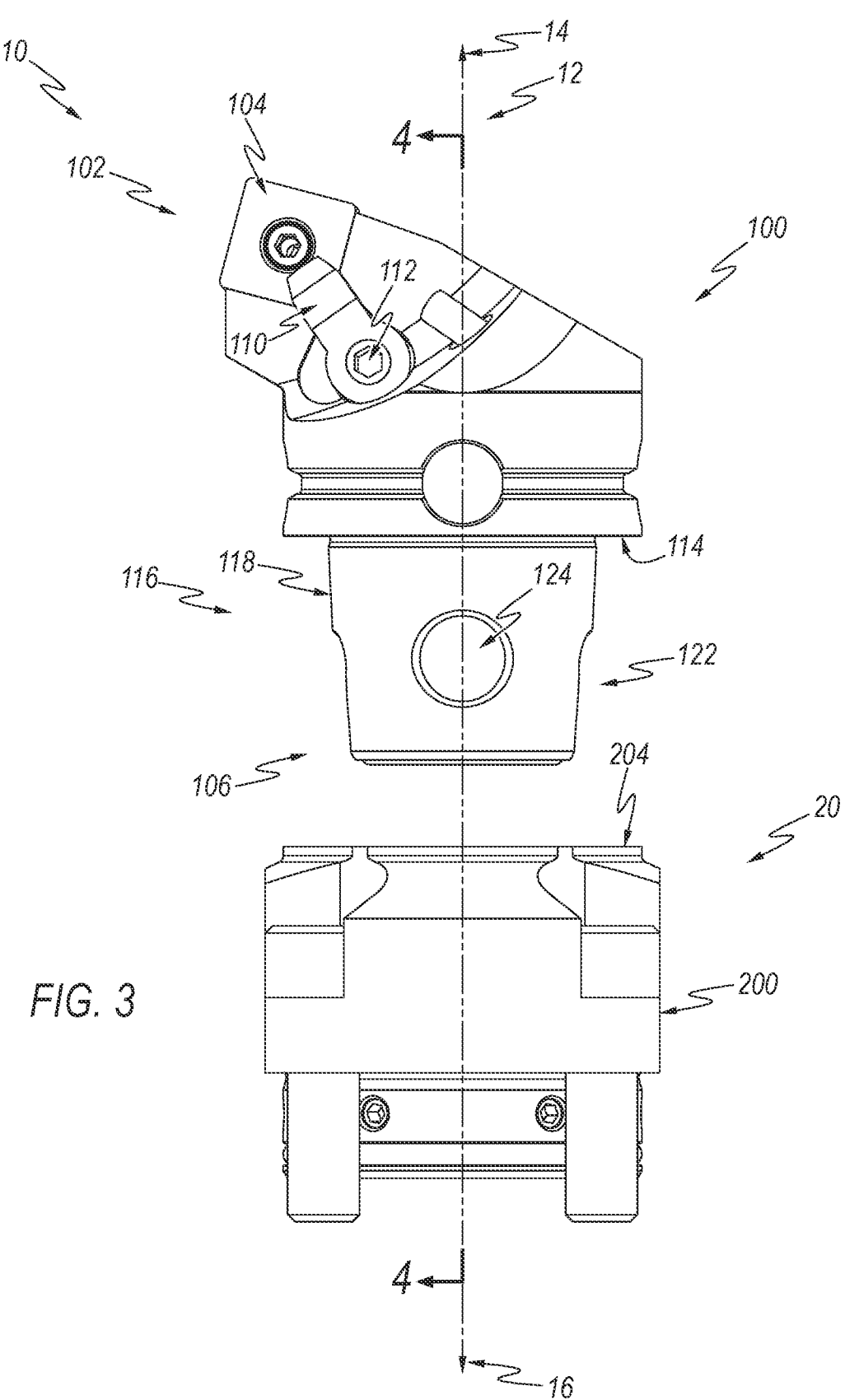
FIG. 3 is a front view of the toolholder assembly of FIG. 1.

As shown in FIGS. 2, 4, and 6, the base member 200 further includes a canister 208, which is sized to be received within the shank bore 120 of the toolholder 100. As illustrated the canister 208 is a separate component from the flange 204 of the base member 200. Alternatively, the canister 208 may be integrated with the flange 204 of the base member 200. The canister 208 includes a canister wall 210 defining a canister bore 212 sized to receive the lock rod 300 and one or more locking members 302 therein. As illustrated, the lock rod 300 moves within canister bore 212 of the canister 208, which is within the internal bore 202 of the base member 200. The canister wall 210 further defines one or more locking passageways 214 and an access bore 216. The shank wall 118 is sized to be received within a space defined between the bore wall 206 and canister 208. When the shank 116 of the toolholder 100 is aligned within the base member 200, the one or more locking apertures 124 of the toolholder 100 are aligned with the one or more locking passageways 214 of the canister wall 210 and the one or more locking members 302.

As shown in FIGS. 2, 4, and 6, the lock rod 300 has a forward end 304 and a rearward end 306. Between the forward end 304 and the rearward end 306 of the lock rod 300 are one or more depressions 308 and one or more sloped surfaces 310 which are aligned with the one or more locking passageways 214 of the canister wall 210 when in the unlocked position. The lock rod 300 is moveable within the canister bore 212 in forward and rearward directions between an unlocked position and a locked position.

Figure 9:
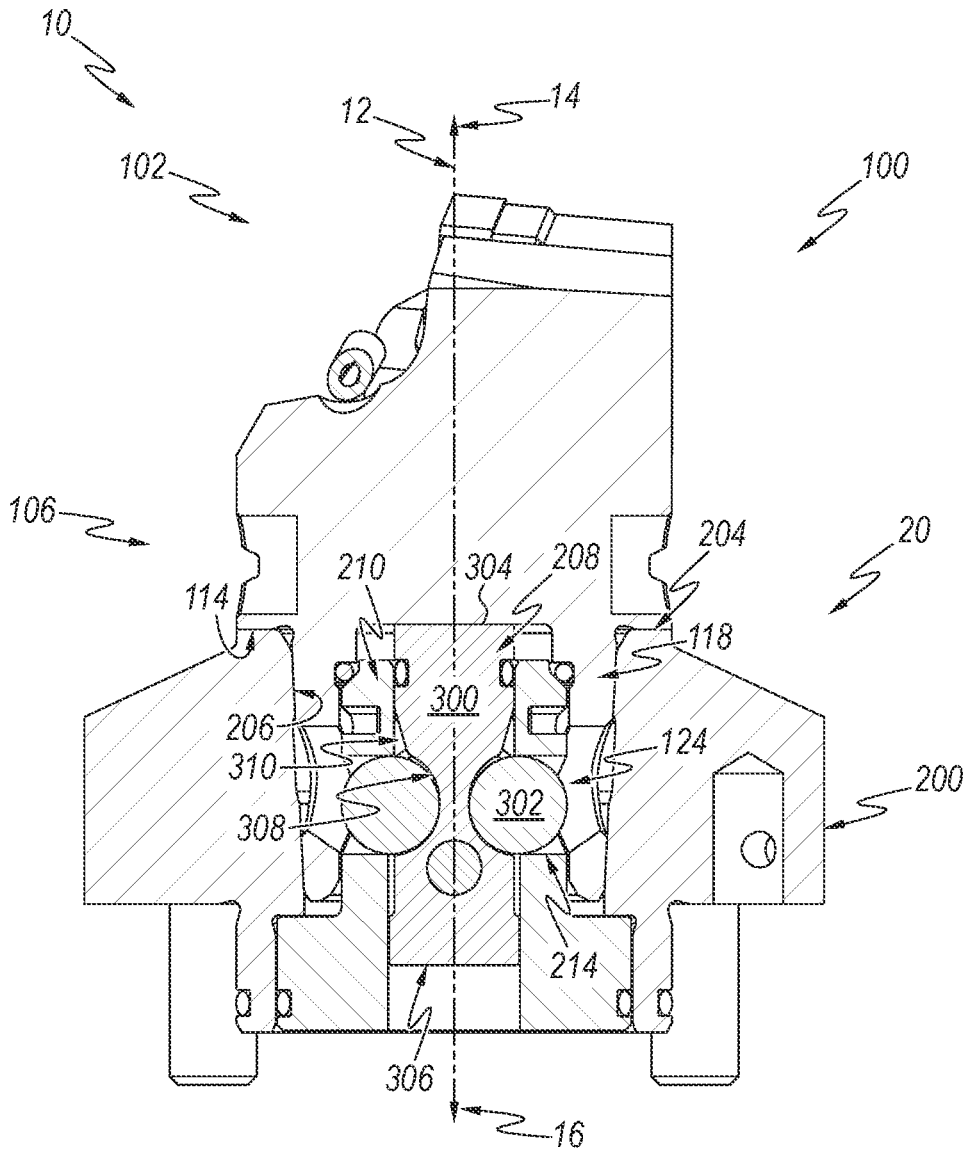
FIG. 9 is a sectional view of the toolholder assembly of FIG. 8 taken along line 9-9, in an unclamped position.
Figure 10:
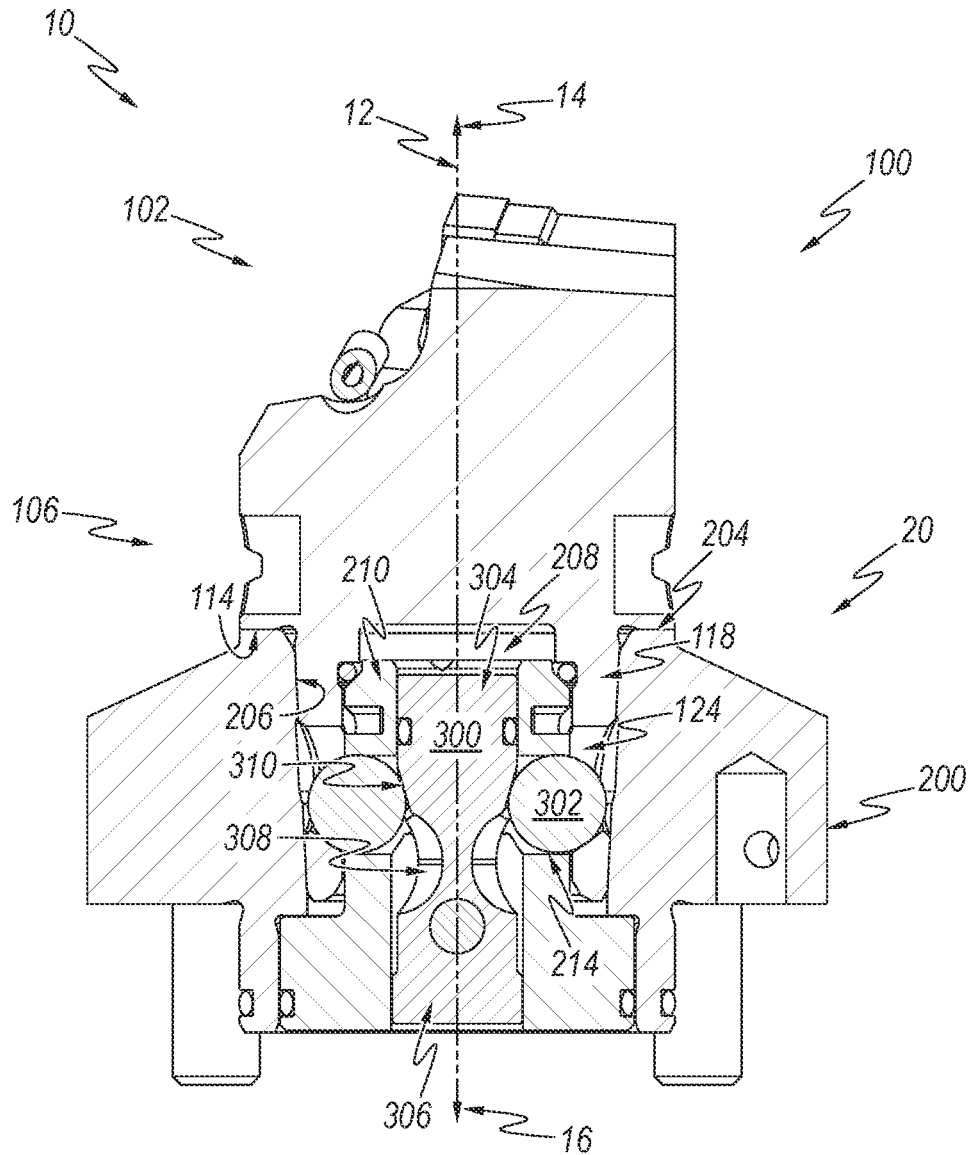
FIG. 10 is a sectional view of the toolholder assembly of FIG. 8 taken along line 10-10, in a clamped position.
Figure 11:
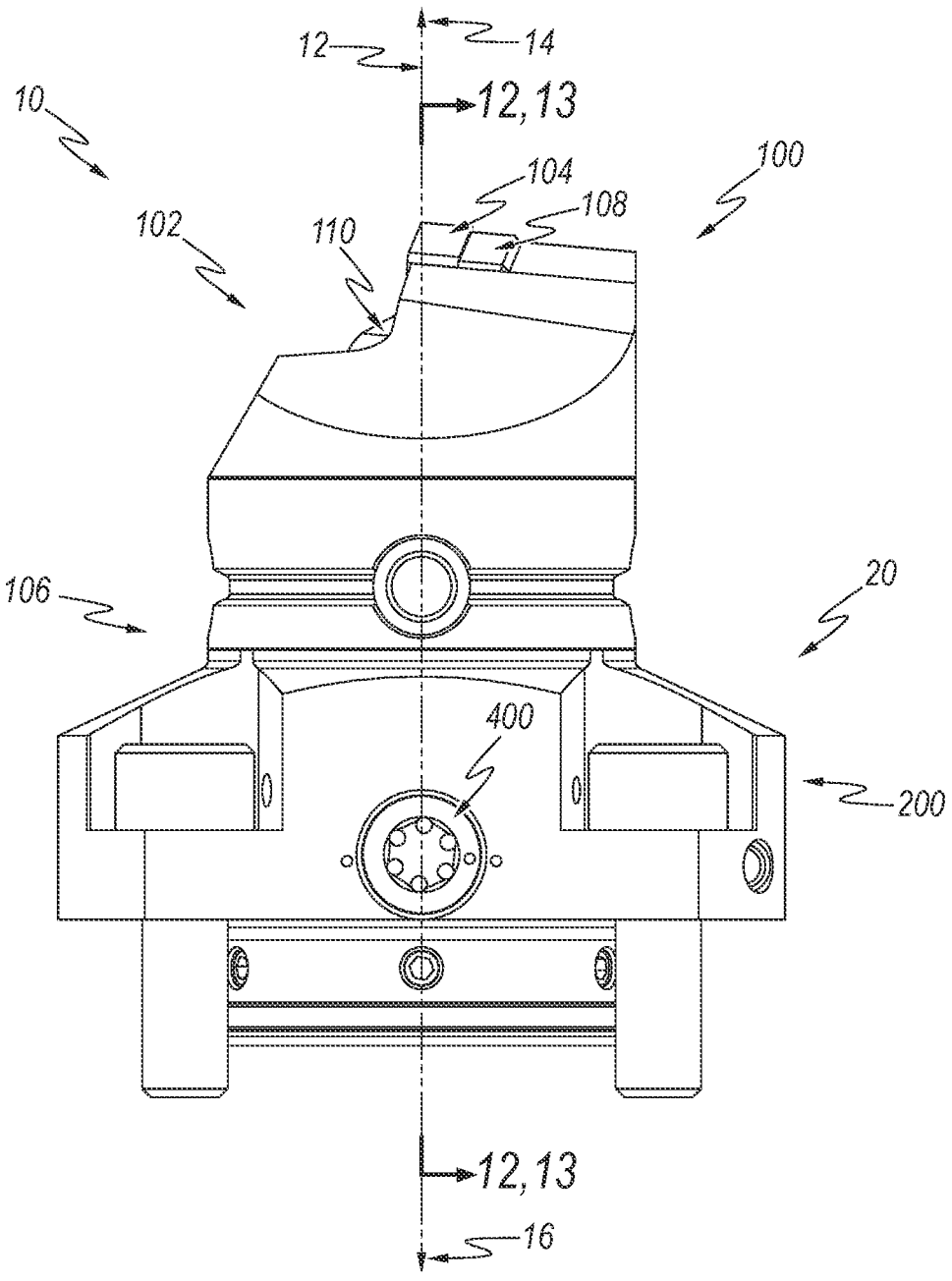
FIG. 11 is a side view of the toolholder assembly of FIG. 7.
Figure 12:
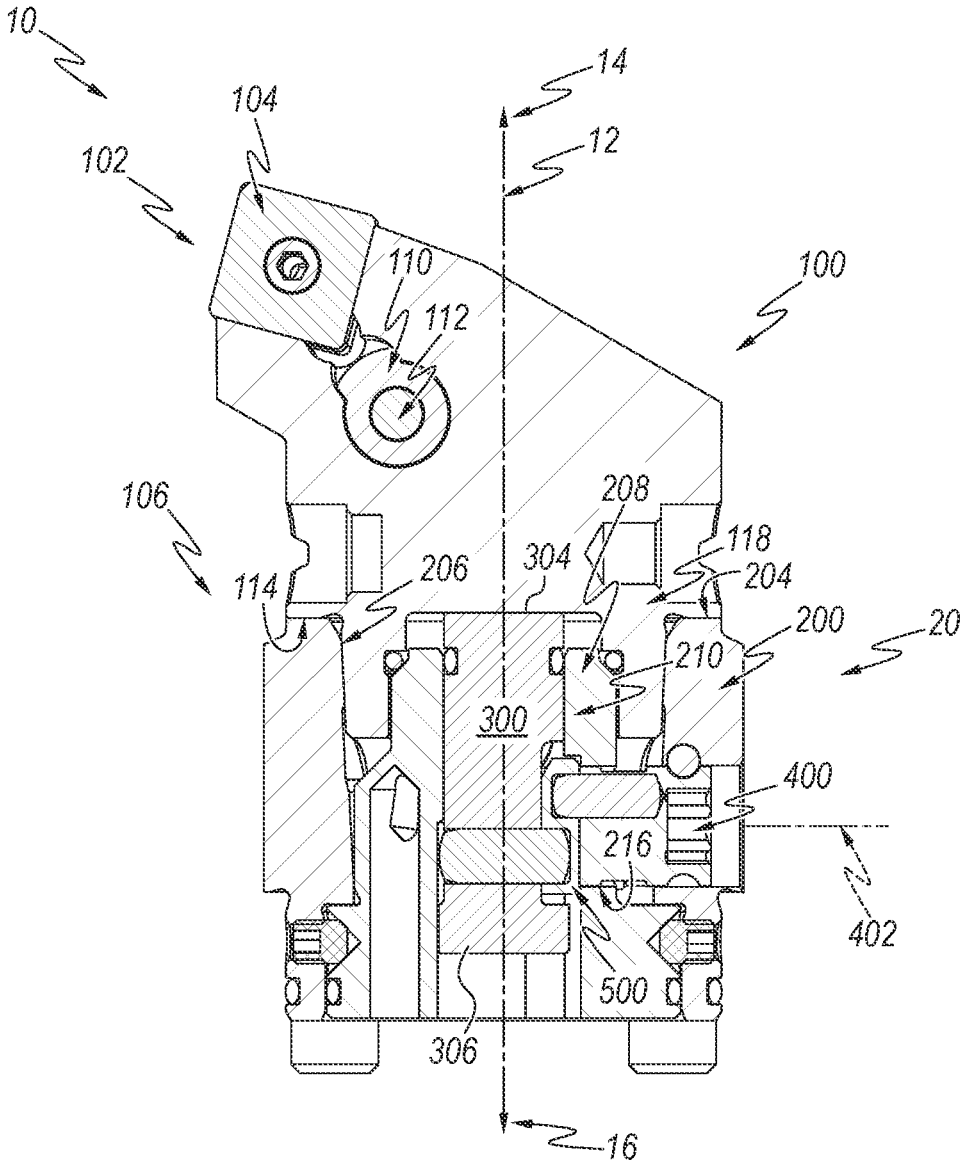
FIG. 12 is a sectional view of the toolholder assembly of FIG. 11 taken along line 12-12, in which the clamping assembly is in the unclamped position.
Figure 13:
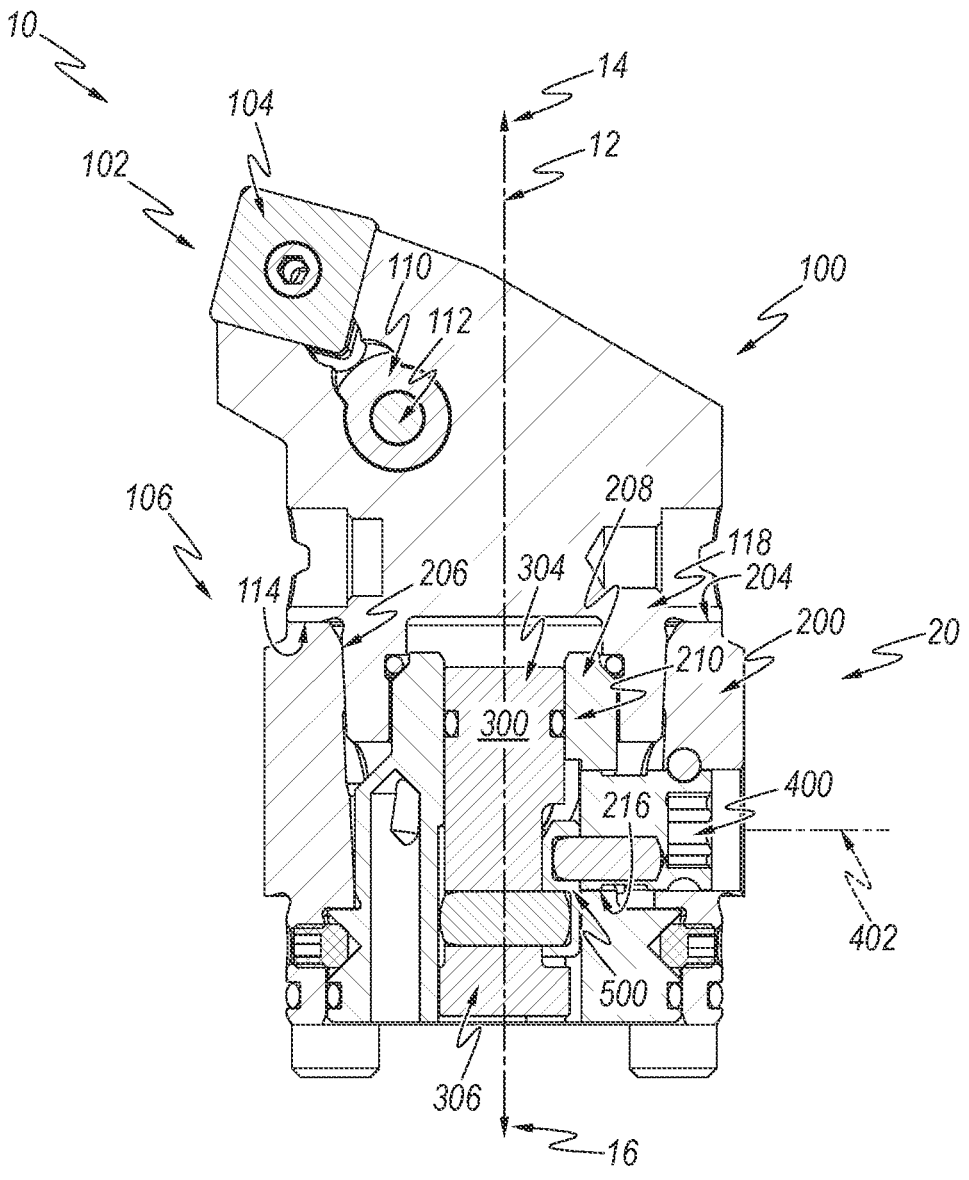
FIG. 13 is a sectional view of the toolholder assembly of FIG. 11 taken along line 13-13, in which the clamping assembly is in the clamped position.

Referring to FIGS. 9 and 10, when the lock rod 300 is positioned in the rearward direction, the one or more locking members 302 positioned within the one or more locking passageways 214 of the canister 208 are urged radially outwardly by the one or more sloped surfaces 310 of the lock rod 300. Thus, the one or more locking members 302 are moved radially outward through the one or more locking passageways 214 by the one or more sloped surfaces 310 of the lock rod 300 and engage the sloped interior surfaces 126 of the one or more locking apertures 124. As the one or more locking members 302 travel radially outward through the one or more locking passageways 214, they engage the sloped interior surfaces 126 of the one or more locking apertures 124 within the shank wall 118 and the one or more locking members 302 become wedges therein and thus the toolholder 100 is clamped in position. When the toolholder 100 is clamped within the base member 200, the wedging action creates high frictional forces retaining the toolholder 100 within the base member 200.

When the lock rod 300 is moved in the forward direction to an unlocked position, the one or more locking members 302 travel radially inward through the one or more locking passageways 214 to the one or more depressions 308. Thus, the one or more locking members 302 disengage from the sloped interior surfaces 126 of the one or more locking apertures 124 within the shank wall 118 resulting in the unclamping of the toolholder 100. In this configuration, the shank 116 of the toolholder 100 may be removed from the base member 200 and a new toolholder 100 may be inserted into the internal bore 202 of the base member 200, thereby providing for quick changing of the toolholder 100.

In the illustrated example, the movement of the lock rod 300 in the rearward direction clamps the toolholder 100 within the base member 200, and movement of the lock rod 300 in the forward direction releases the toolholder from the base member 200. However, in an alternative embodiment (not shown), movement of the lock rod 300 in the forward direction could clamp the toolholder 100 within the base member 200, and movement of the lock rod 300 in the rearward direction could release the toolholder 100 from the base member 200.

One focus of the present description is on the mechanism used to move the lock rod 300 in the forward and rearward directions. While the above-described toolholder 100, base member 200, and lock rod 300 are typical arrangements for a toolholder assembly, the mechanism of the present description may be used to move a lock rod for alternative toolholder assembly arrangements other than the toolholder assembly 10 illustrated and described above.

Referring to FIGS. 12 to 15, the crank wheel 400 is rotatable about an axis of rotation 402, and the linkage 500 is coupled to the lock rod 300 and coupled to the crank wheel 400 at a position radially offset from the axis of rotation 402 of the crank wheel 400. Thus, the linkage 500 functions as a connecting rod between the rotating crank wheel 400 and the sliding lock rod 300, transforming the rotational movement of the crank wheel 400 into a reciprocating forward and rearward motion of the lock rod 300 to move the lock rod between the unlocked position and the locked position.

Figure 14:
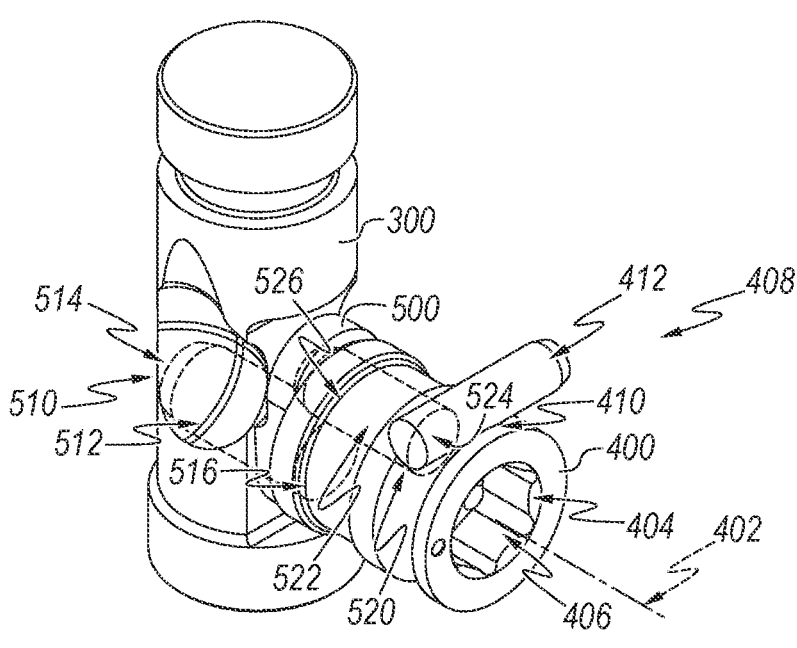
FIG. 14 is a perspective view of the lock rod, crank wheel, and linkage of FIG. 2, in which the clamping assembly is in the unclamped position.
Figure 15:
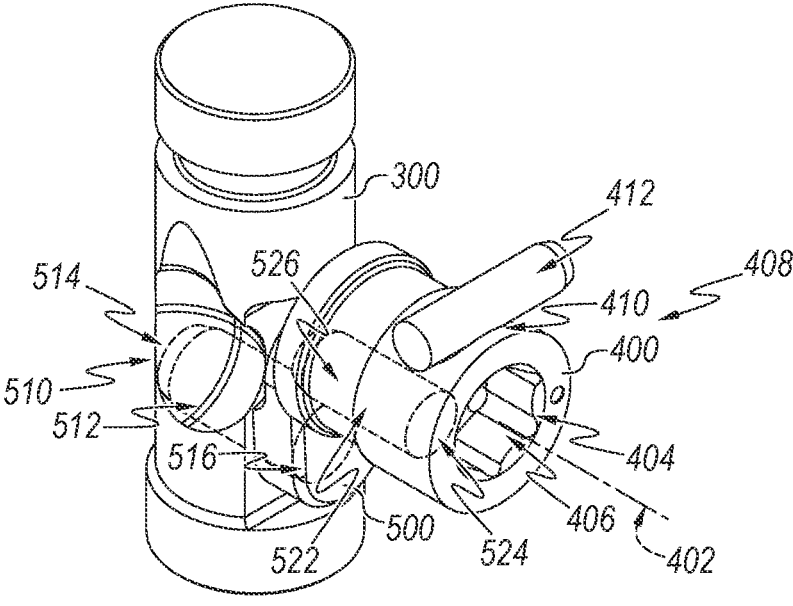
FIG. 15 is a perspective view of the lock rod, crank wheel, and linkage of FIG. 2, in which the clamping assembly is in the clamped position.

As best shown in FIGS. 14 to 15, to facilitate rotation, the crank wheel 400 may have a torque receiving feature 404, such as the illustrated hexagonal feature 406 for receiving a hexagonal key. To limit rotation, the crank wheel 400 may have a rotation-limiting feature 408, such as the semi-annular slot 410, as best illustrated in FIG. 2, that engages with a stop pin 412 for limiting rotation of the crank wheel 400. For example, the stop pin 412 may limit rotation from about 0 to about 300 degrees, preferably from about 0 to about 200 degrees.

Referring to FIGS. 12 to 15, the linkage 500 may be rotationally coupled to the lock rod 300 in any manner. In the illustrated example, the linkage 500 is rotationally coupled to the lock rod 300 by a first pin joint 510. As shown, the first pin joint 510 includes a first pin 512 rotationally coupled within a first bearing 514 within the lock rod 300 and within a second bearing 516 within the linkage 500. Alternatively, the first pin 512 may be rotationally coupled within a bearing 514, 516 within one of the linkage 500 and the lock rod 300, and the first pin 512 may be fixedly coupled to the other of the linkage 500 and the lock rod 300.

Similarly, the linkage 500 may be rotationally coupled to the crank wheel 400, at a position radially offset from the axis of rotation 402 of the crank wheel 400, in any manner. In the illustrated example, the linkage 500 is rotationally coupled to the crank wheel 400 by a second pin joint 520. As shown, the second pin joint 520 includes a second pin 522 rotationally coupled within a third bearing 524 within the crank wheel 400 and within a fourth bearing 526 within the linkage 500. Alternatively, the second pin 522 may be rotationally coupled within a bearing 524, 526 within one of the linkages 500 and the crank wheel 400, and the second pin 522 may be fixedly coupled to the other of the linkage 500 and the crank wheel 400.

Thus, the linkage 500, being rotationally coupled between the lock rod 300 and the crank wheel 400 at a position radially offset from the axis of rotation 402, moves within the clamping assembly 20 to effectuate the transforming of the rotational movement of the crank wheel 400 into a reciprocating forward and rearward motion of the lock rod 300. In the illustrated example, the first pin joint 510 and the second pin joint 520 enable the rotational coupling of the linkage 500 between the lock rod 300 and the crank wheel 400.

In the illustrated example, the second bearing 516 within the linkage 500 and the fourth bearing 526 within the linkage 500 are shown as blind holes. In an alternative, the second bearing 516 and the fourth bearing 526 may take the form of through holes within the linkage 500.

In the illustrated example, the linkage 500 is shown as a single body coupled to the lock rod 300 and coupled to the crank wheel 400. In an alternative, the linkage 500 may include multiple parts.

In the previous design, the first pin joint 510 between the linkage 500 and the lock rod 300 was used for both clamping and bump-off (i.e., tool ejection). Unfortunately, the use of the first pin joint 510 in this manner may create a high reciprocating stress in the area of the joint. The linkage 500 was also put under high tension during bump-off while releasing the toolholder 100, which is not desired.

Figure 16:
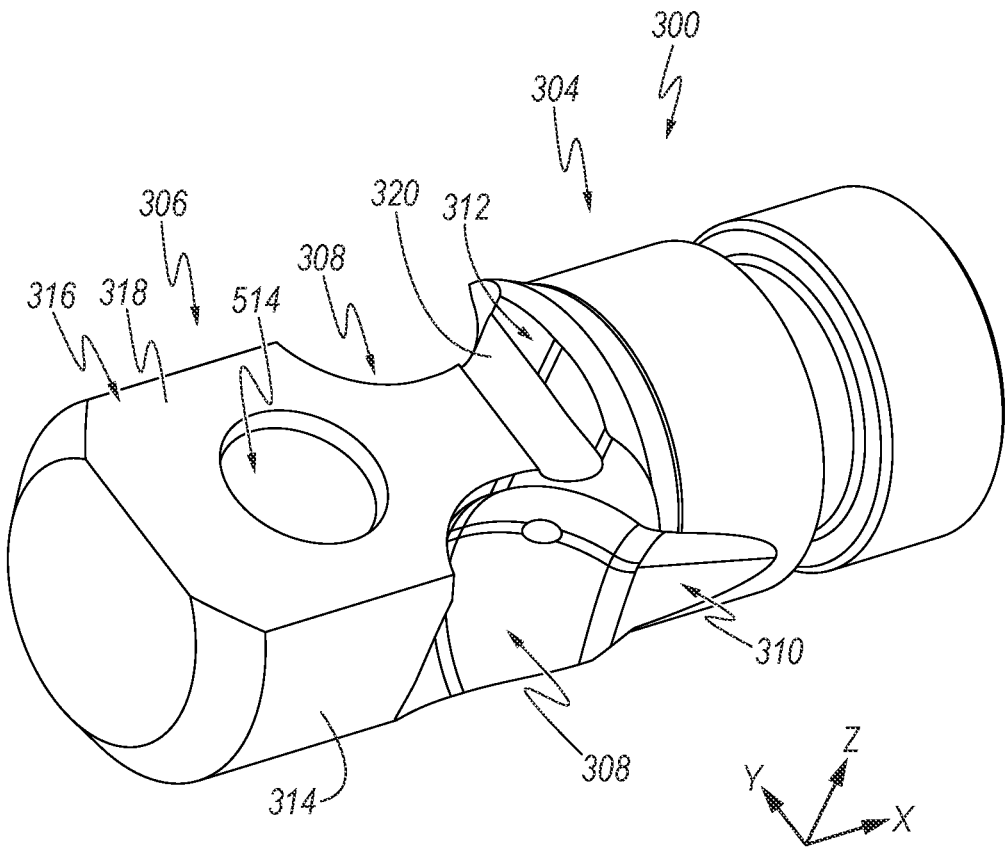
FIG. 16 is a perspective view of a lock rod with a curved cam surface according to an aspect of the disclosure.
Figure 18:
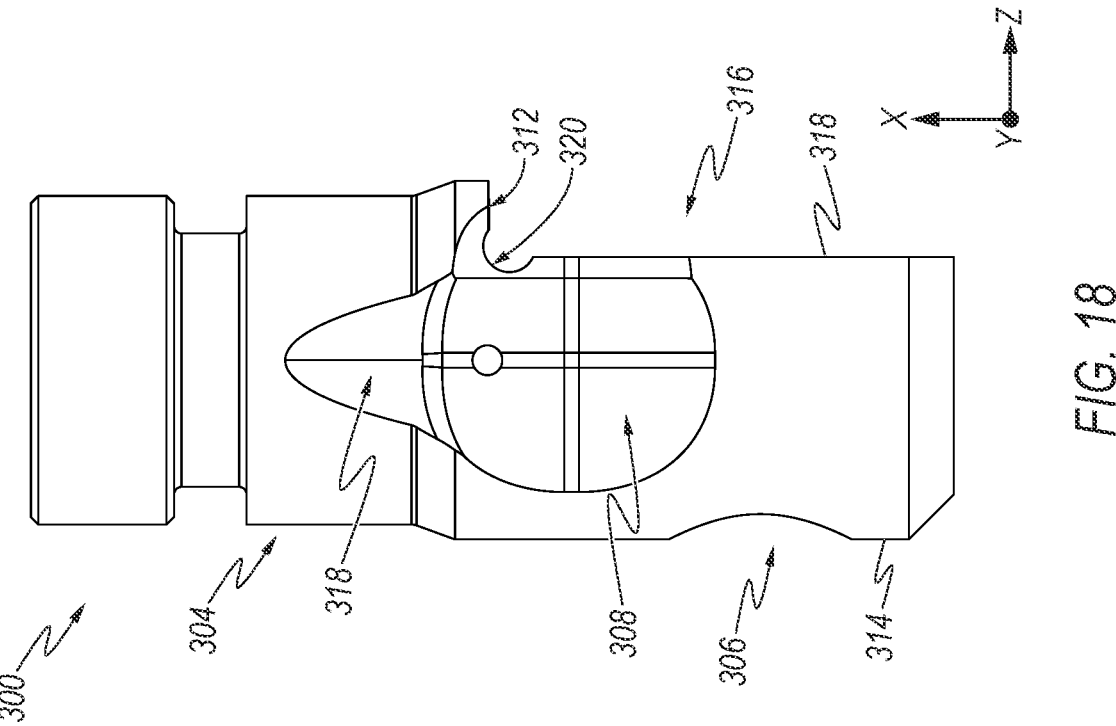
FIG. 18 is another side view of the lock rod of FIG. 16.
Figure 17:
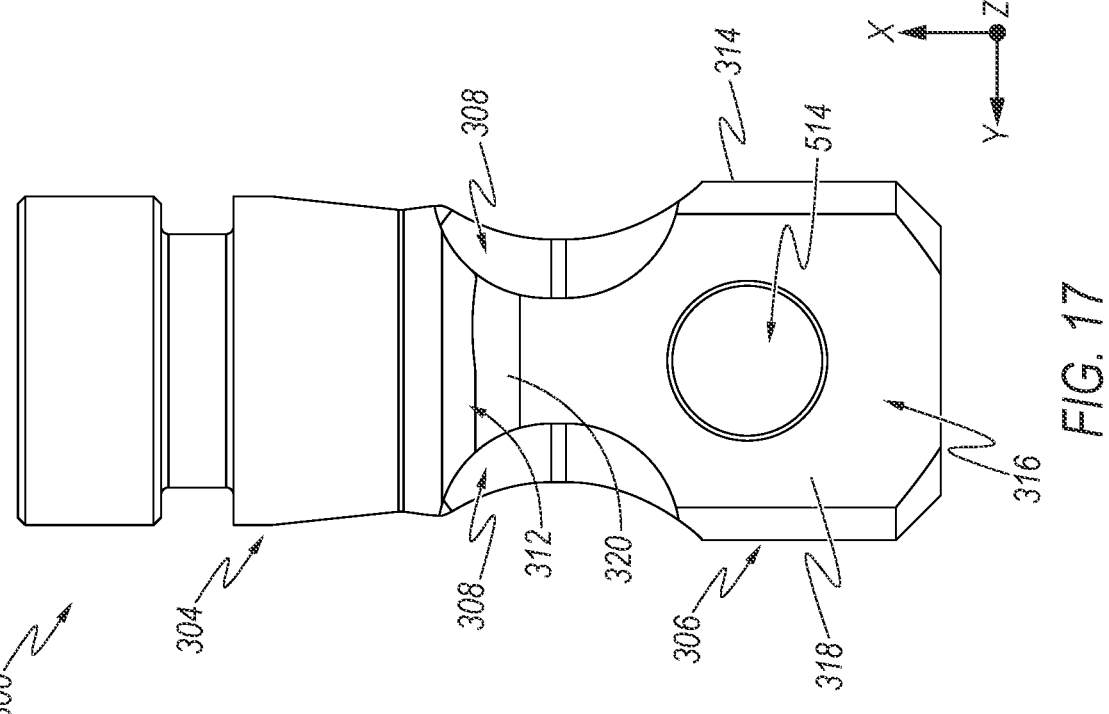
FIG. 17 is a side view of the lock rod of FIG. 16.
Figure 20:
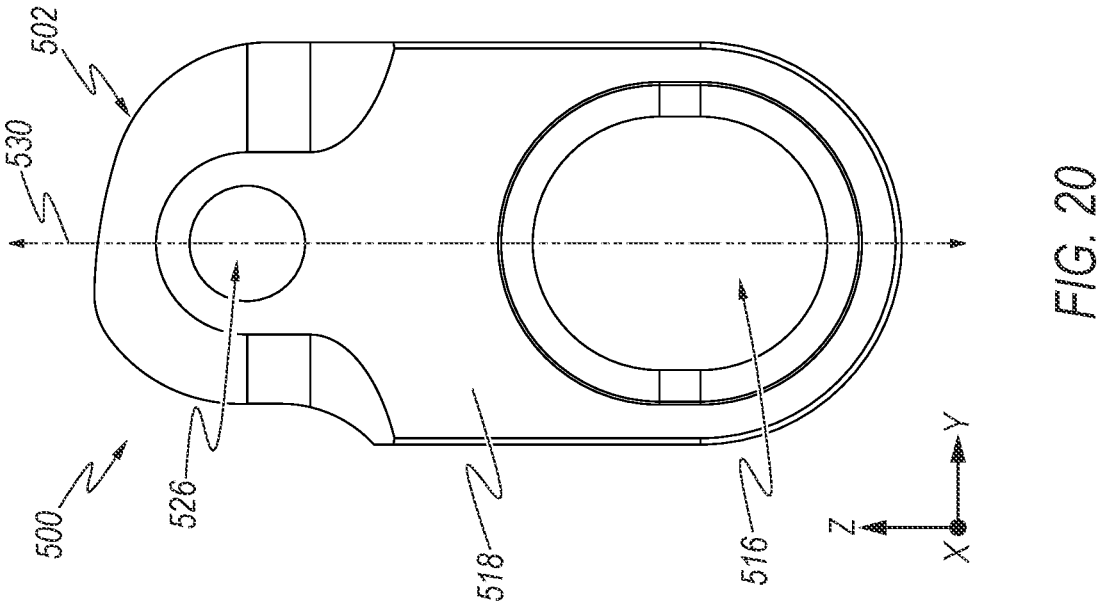
FIG. 20 is a front view of a linkage of FIG. 19.
Figure 19:
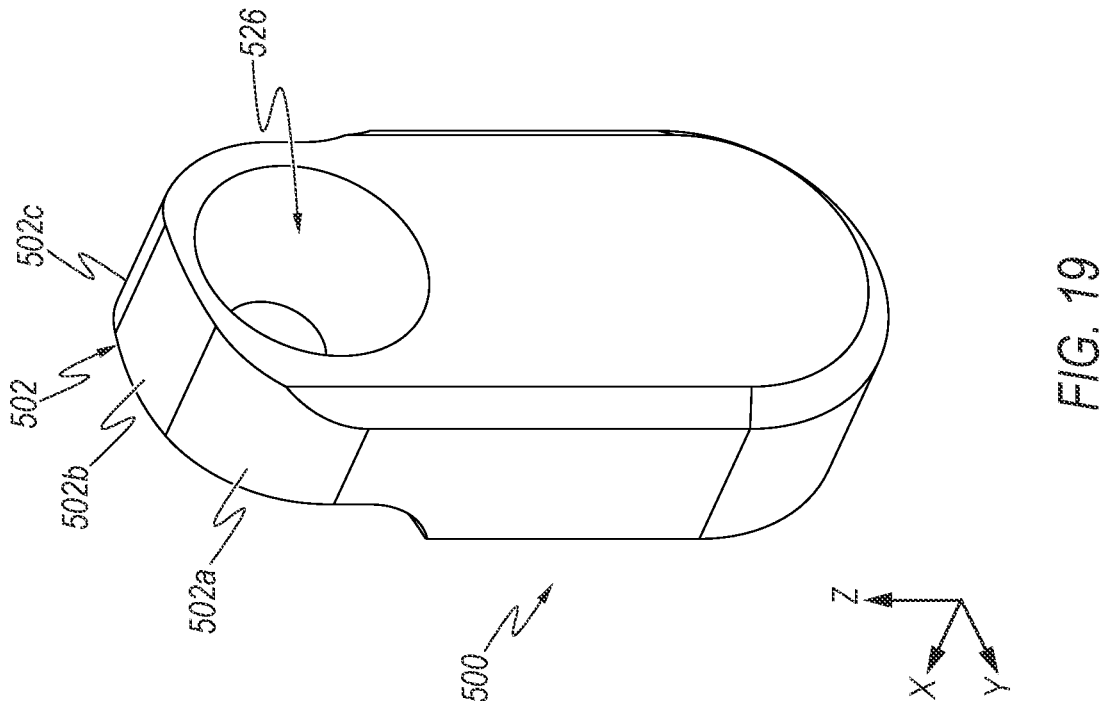
FIG. 19 is a rear perspective view of a linkage with a cam surface and an elongated cavity according to an aspect of the disclosure.
Figure 22:
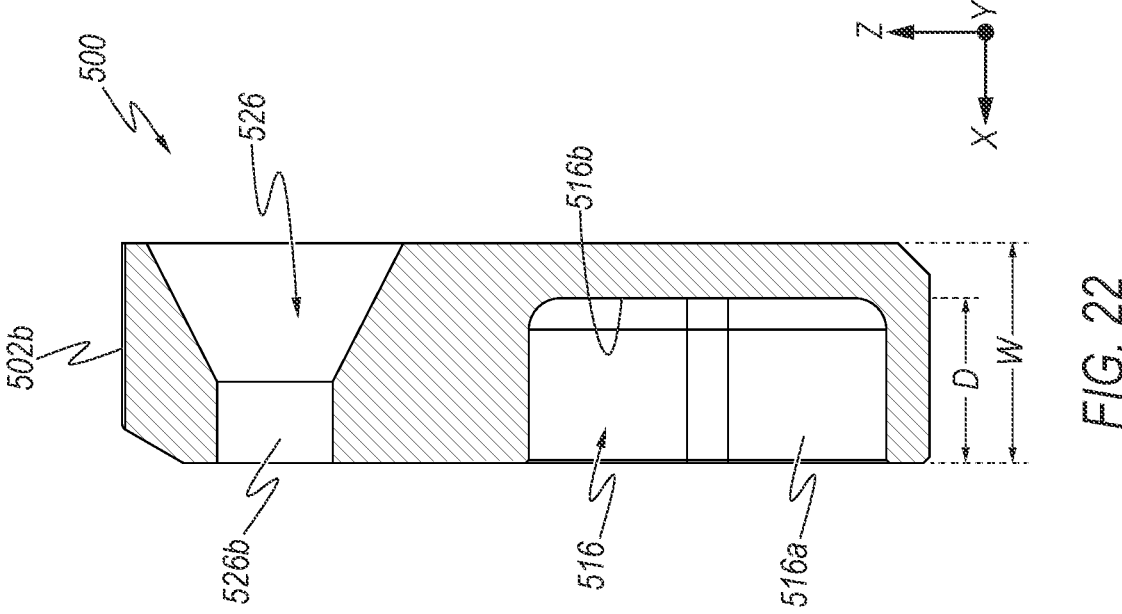
FIG. 22 is a sectional view of the linkage taken through the central, longitudinal axis taken along line 22-22 of FIG. 21.

Referring to FIGS. 16 to 22, a lock rod 300 and a linkage 500 are shown according to another aspect of the disclosure. As shown in FIGS. 16 to 18, the outer surface 314 of the rearward end 306 of the lock rod 300 is not completely cylindrical but includes a substantially planar recess 316 disposed between the depressions 308. The planar recess 316 provides a radial support wall 318 for preventing the linkage 500 from twisting and tipping during operation. The rearward end 306 of the lock rod 300 also includes a concave, arcuate cam surface 312 located proximate the forward end 304. An optional undercut 320 may be formed between the cam surface 312 and the radial support wall 318 for providing clearance and stress relief.

As in the earlier design, the linkage 500 is rotationally coupled to the lock rod 300 by a first pin joint 510. However, in this design, the second bearing 516 has been modified from the earlier design to comprise an elongated cavity 516 formed in a first outer wall 518 of the linkage 500 facing the lock rod 300. As shown in FIGS. 19 to 22, the elongated cavity 516 has a depth, D, of more than one-half the width, W, of the linkage 500 such that the elongated cavity 516 is capable of at least partially receiving the first pin 512 of the first pin joint 510. It should be noted that the linkage 500 has a second outer wall 519 opposite the first outer wall 518. In the illustrated embodiment, the second radial outer wall 519 is substantially planar to enable the first out wall 518 of the linkage 500 to make face contact with the radial support wall 318 of the lock rod 300.

In the illustrated embodiment, the elongated cavity 516 is substantially oval shaped having a side surface 516a and a bottom surface 516b. The elongated cavity 516 enables to the linkage 500 to be both rotationally and translationally coupled to the lock rod 300 by the first pin joint 510. Specifically, while rotating, the first pin 512 translates or moves in a linear direction (i.e., the z-direction) within the elongated cavity 516 along the central, longitudinal axis 530 of the linkage 500. This linear movement of the first pin 512 enables the bump-off of the tool holder 100. It should be appreciated that the invention is not limited by an oval shaped cavity, and that the invention can be practiced with other geometric shapes, such as elliptical, polygonal, and the like, so long as the first pin 512 can translate, as well as rotate, within the elongated cavity 516.

Figure 21:
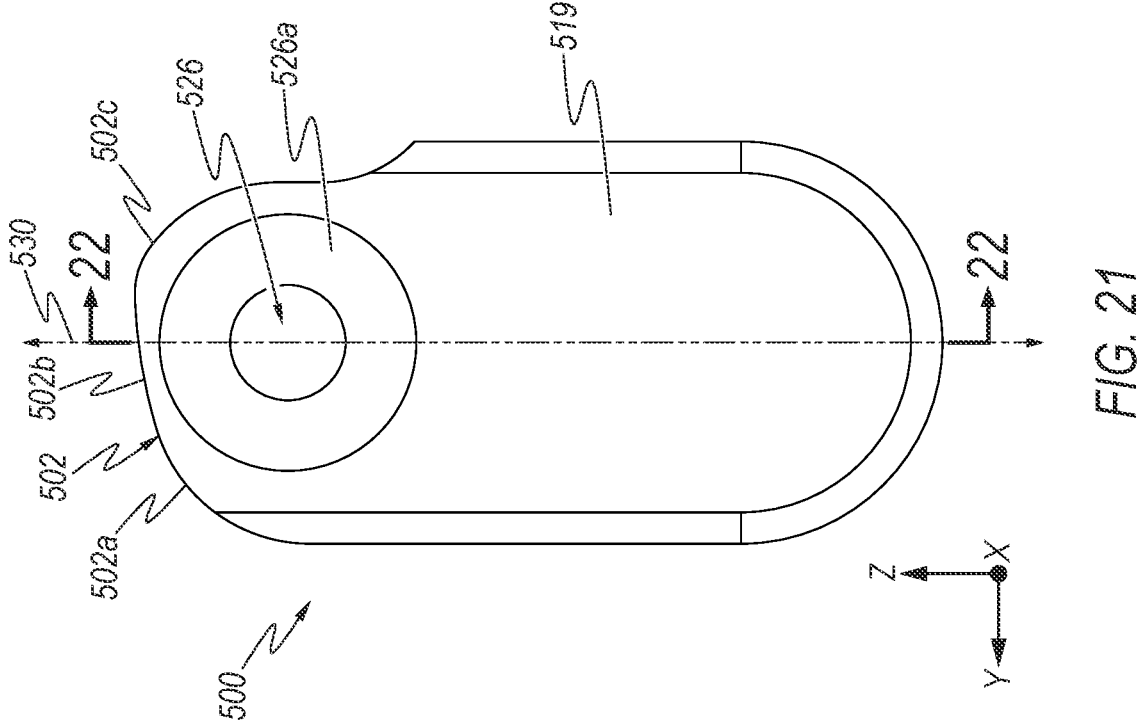
FIG. 21 is a rear view of the linkage of FIG. 19.

In addition, the linkage 500 has been modified from the earlier design to incorporate a cam surface 502 on one end proximate the fourth bearing 526 that interacts with the cam surface 312 on the lock rod 300 to assist with placing the lock rod 300 in the unlocked position (i.e., bump-off), thereby separating the clamping and bump-off features. The cam surface 502 is located on an outer peripheral surface at one end of the linkage 500. As shown in FIG. 21, the cam surface 502 is defined by a plurality of tangent surfaces, wherein each surface may have a different radius. In the illustrated embodiment, the cam surface 502 has three tangent surfaces: a first tangent surface 502a, a second tangent surface 502b and a third tangent surface 502c. However, it should be appreciated that the invention is not limited by the number of tangent surfaces, and that the invention can be practiced with any desirable number of tangent surfaces to provide sufficient contact with the cam surface 312 of the lock rod 300.

In the illustrated embodiment, the second tangent surface 502b is generally upwardly sloping when starting at the first tangent surface 502a and moving toward the third tangent surface 502c, as shown in FIG. 21. In addition, the second tangent surface 502b has a radius that is substantially identical to the radius of the curved cam surface 312 of the lock rod 300 to reduce the Hertzian contact stress. The length and position of the second tangent surface 502b should be such that the cam surface 502 of the linkage 500 only contacts the curved or arcuate cam surface 312 of the lock rod 300. During initial bump-off of the tool holder 100, the first contact between the cam surface 312 of the lock rod 300 and the linkage 500 will occur on the second tangent surface 502b proximate the first tangent surface 502a. As the crank wheel 400 is rotated toward the final bump-off of the tool holder 100, the contact between the cam surface 312 of the lock rod 300 and the linkage 500 will shift from proximate the first tangent surface 502a towards the third tangent surface 502c.

Similar to the earlier design, the linkage 500 may be rotationally coupled to the crank wheel 400, at a position radially offset from the axis of rotation 402 of the crank wheel 400, in any manner. In the illustrated example, the linkage 500 is rotationally coupled to the crank wheel 400 by the second pin joint 520. As shown, the second pin joint 520 includes a second pin 522 rotationally coupled within a third bearing 524 within the crank wheel 400 and within a fourth bearing 526 within the linkage 500. Unlike the earlier design, the second pin 522 may be tapered or conical at one end and the fourth bearing 526 has a tapered or conical surface 526a for interacting with the tapered or conical end of the second pin 522 during operation. The linkage 500 and the second pin 522 having a tapered or conical design allows more material to be added to the linkage 500 to help reduce stress. The fourth bearing 526 also has a non-tapered portion 526b that does not interact with the tapered second pin 522 during operation.

In the illustrated example, the elongated cavity 516 within the linkage 500 is shown as a blind hole. In an alternative, the elongated cavity 516 may take the form of an elongated through hole within the linkage 500. In addition, the fourth bearing 526 in the linkage 500 is shown as a through hole. In an alternative, the fourth bearing 526 may take the form of a blind hole within the linkage 500.

When starting in the locked position and moving towards the unlocked position, as the crank wheel 400 is rotated in a first direction, for example, in a counterclockwise direction, the linkage 500 is pulled away from the first pin 512, and the first pin 512 is able to freely travel in the elongated cavity 516, thereby allowing the linkage 500 to advance in a forward direction without pulling the lock rod 300. In other words, the first pin 512 is free to both rotate and move in the forward direction along the central, longitudinal axis 530 within the elongated cavity 516. As the linkage 500 continues to advance the forward direction, the cam surface 502 of the linkage 500 eventually contacts the cam surface 312 of the lock rod 300 and pushes the lock rod 300 in the forward direction 14 to place the lock rod 300 in the unlocked position (i.e., bump-off position). In the unlocked position, no gap exists between the cam surface 502 of the linkage 500 and the cam surface 312 of the lock rod 300, but there is a small gap between the side surface 516a of the elongated cavity 516 of the linkage 500 and the first pin 512.

The lock rod 300 is placed in the locked position (i.e., clamped position) from the unlocked position in the same manner as in the earlier design. However, unlike the earlier design, the second pin 522 interacts with the tapered or conical surface 526a of the linkage 500, rather than a hole with a non-tapered surface, thereby reducing stress in the clamping assembly 20. In the locked position, a small gap exists between the cam surface 502 of the linkage 500 and the cam surface 312 of the lock rod 300, and no gap exists between the side surface 516a of the elongated cavity 516 of the linkage 500 and the first pin 512.

Although various embodiments of the disclosed clamping assembly, toolholder assembly, the method of changing a toolholder in a toolholder assembly have been shown and described, modifications may occur to those skilled in the art upon reading the specification. The present application includes such modifications and is limited only by the scope of the claims.

What is claimed is:

1. A clamping assembly, comprising:
a base member having an internal bore;
a lock rod within the internal bore of the base member and moveable between an unlocked position and a locked position, the lock rod including a lock rod cam surface and a first bearing, the lock rod cam surface formed with a radius;
a crank wheel having an axis of rotation and a third bearing; and
a linkage including a second bearing comprising an elongated cavity formed in an outer wall facing the lock rod, a fourth bearing, and a cam surface at one end thereof, the cam surface formed with a radius that is substantially identical to the radius of the lock rod cam surface to reduce Hertzian contact stress,
wherein the linkage is rotationally and translationally coupled to the lock rod by a first pin joint comprising a first pin received within the first bearing of the lock rod and at least partially received within the second bearing of the linkage,
wherein the linkage is rotationally coupled to the crank wheel by a second pin joint comprising a second pin received with the third bearing of the crank wheel and within the fourth bearing of the linkage,
wherein rotation of the crank wheel in a first direction causes the cam surface of the linkage to engage the lock rod cam surface to place the lock rod in the unlocked position, and
wherein rotation of the crank wheel in a second direction opposite to the first direction causes the first pin to engage the second bearing of the linkage to place the lock rod in the locked position.

2. The clamping assembly of claim 1, wherein the cam surface of the linkage does not engage the lock rod cam surface when the lock rod is in the locked position.

3. The clamping assembly of claim 1, wherein a gap exists between the first pin and the linkage when the lock rod is in the unlocked position.

4. The clamping assembly of claim 1, wherein the lock rod comprises a forward end and a rearward end.

5. The clamping assembly of claim 4, wherein an outer surface of the rearward end of the lock rod includes a substantially planar recess including a radial support wall for preventing the linkage from twisting and tipping during operation.

6. The clamping assembly of claim 5, wherein the lock rod includes an undercut formed between the cam surface and the radial support wall for providing clearance and stress relief.

7. The clamping assembly of claim 1, wherein the lock rod cam surface comprises a groove formed on an outer surface of the lock rod.

8. The clamping assembly of claim 1, wherein the linkage comprises a plurality of cam surfaces, and wherein each of the plurality of cam surfaces have different radii.

9. The clamping assembly of claim 1, wherein the elongated cavity comprises a blind hole.

10. The clamping assembly of claim 1, wherein the elongated cavity comprises a through hole.

11. The clamping assembly of claim 1, wherein the third bearing of the crank wheel is located at a position radially offset from the axis of rotation of the crank wheel.

12. The clamping assembly of claim 1, wherein the linkage includes a tapered or conical hole for cooperating with the second pin.

13. The clamping assembly of claim 1, wherein the lock rod cam surface comprises a curved surface formed by a groove.

14. The clamping assembly of claim 1, wherein rotation of the crank wheel in the second direction also causes a gap between the cam surface of the linkage and the lock rod cam surface.

15. A method of changing a toolholder in a clamping assembly as recited in claim 1, the method comprising:
rotationally and translationally coupling the linkage to the lock rod by a first pin joint comprising a first pin received within the first bearing of the lock rod and at least partially received within the second bearing of the linkage;
rotationally coupling the linkage to the crank wheel by a second pin joint comprising a second pin received with the third bearing of the crank wheel and within the fourth bearing of the linkage;
rotating the crank wheel in a first direction to cause the cam surface of the linkage to engage the lock rod cam surface to place the lock rod in the unlocked position to unclamp a first toolholder from the clamping assembly;
removing the first toolholder from the clamping assembly;
inserting a second toolholder into the clamping assembly; and
rotating the crank wheel in a second direction opposite to the first direction to cause the first pin to engage the second bearing of the linkage to place the lock rod in the locked position.

16. A clamping assembly, comprising:
a base member having an internal bore;
a lock rod within the internal bore of the base member and moveable between an unlocked position and a locked position, the lock rod including a lock rod cam surface and a first bearing, the lock rod cam surface formed with a radius;
a crank wheel having an axis of rotation and a third bearing; and
a linkage including a second bearing comprising an elongated cavity formed in an outer wall facing the lock rod, a fourth bearing, and a cam surface at one end thereof, the cam surface formed with a radius that is substantially identical to the radius of the lock rod cam surface to reduce Hertzian contact stress,
wherein the linkage is rotationally and translationally coupled to the lock rod by a first pin joint comprising a first pin received within the first bearing of the lock rod and at least partially received within the second bearing of the linkage,
wherein the linkage is rotationally coupled to the crank wheel by a second pin joint comprising a second pin received with the third bearing of the crank wheel and within the fourth bearing of the linkage,
wherein rotation of the crank wheel in a first direction causes the linkage to move away from the first pin such that the first pin travels freely in the elongated cavity of the linkage, thereby allowing the linkage to move without pulling the lock rod until the linkage eventually contacts the lock rod cam surface and pushes the lock rod in the forward direction to place the lock rod in the unlocked position.

17. The clamping assembly of claim 16, wherein rotation of the crank wheel in a second direction opposite to the first direction causes the first pin to engage the second bearing of the linkage to place the lock rod in the locked position.

* * * * *